US011859889B2

(12) United States Patent
Rupp

(10) Patent No.: US 11,859,889 B2
(45) Date of Patent: Jan. 2, 2024

(54) ICE SHAVING MACHINE

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 939 days.

(21) Appl. No.: 16/459,594

(22) Filed: Jul. 1, 2019

(65) Prior Publication Data

US 2020/0003472 A1 Jan. 2, 2020

Related U.S. Application Data

(60) Provisional application No. 62/692,596, filed on Jun. 29, 2018.

(51) Int. Cl.
F25C 5/12 (2006.01)
A23G 9/04 (2006.01)

(52) U.S. Cl.
CPC .............. F25C 5/12 (2013.01); A23G 9/045 (2013.01)

(58) Field of Classification Search
CPC .. F25C 5/02; F25C 5/043; F25C 5/046; F25C 5/12; Y10S 241/17; A47J 43/06; A23G 9/045
USPC .................................................. 241/DIG. 17
See application file for complete search history.

(56) References Cited

U.S. PATENT DOCUMENTS 2,046,396 A * 7/1936 Matter ..................... F25C 5/043
99/581
4,456,185 A 6/1984 Ribassin et al.
5,138,940 A * 8/1992 Geissler ................... B26D 7/06
83/672
6,527,212 B2 * 3/2003 Rupp ......................... F25C 5/12
241/86.1
6,637,681 B1 10/2003 Planca et al.
(Continued)

FOREIGN PATENT DOCUMENTS

WO WO-2017118492 A1 * 7/2017 ............ A47J 43/046

OTHER PUBLICATIONS

United States Patent and Trademark Office, "International Search Report", dated Sep. 10, 2019, International Application No. PCT/US2019/40212.

(Continued)

Primary Examiner — Katrina M Stransky
Assistant Examiner — Jared O Brown
(74) Attorney, Agent, or Firm — TechLaw Ventures, PLLC; Terrence J. Edwards

(57) ABSTRACT

Systems, methods, and devices for preparing shaved ice confections. A device for conditioning ice includes a base housing comprising at least one upstanding sidewall defining an interior space and an upper surface with respect to the at least one upstanding sidewall. The device includes a motor disposed within the interior space of the base housing. The devices includes a sidewall disposed within the upper surface of the base housing defining an opening for receiving a drive shaft therethrough, wherein the drive shaft is mechanically connected to the motor and a blade assembly. The device includes a venting channel disposed in the at least one upstanding sidewall of the base housing for releasing heat emitted by the motor. The device includes a control mechanism for activating and deactivating the motor.

21 Claims, 22 Drawing Sheets

(56) References Cited

U.S. PATENT DOCUMENTS

| | | | |
|---|---|---|---|
| 2005/0185507 A1* | 8/2005 | Beesley | A47J 43/06 |
| | | | 366/205 |
| 2010/0024461 A1* | 2/2010 | Buchstab | F25C 5/24 |
| | | | 62/340 |
| 2010/0257874 A1 | 10/2010 | Muller | |
| 2013/0233142 A1* | 9/2013 | Rupp | F25C 5/12 |
| | | | 83/401 |
| 2014/0241109 A1 | 8/2014 | Paget | |
| 2015/0136887 A1 | 5/2015 | Rupp | |
| 2016/0015217 A1 | 1/2016 | Rojas Restrepo et al. | |
| 2016/0120367 A1* | 5/2016 | Braun | A47J 43/0727 |
| | | | 366/314 |
| 2016/0256005 A1* | 9/2016 | Dickson, Jr. | A47J 43/0727 |
| 2017/0296992 A1* | 10/2017 | Kolar | B01F 35/3204 |

OTHER PUBLICATIONS

European Patent Office Patent Translate, "Device for mixing and / or pureeing food and method for controlling this device," WO2017118492, dated Oct. 9, 2019.

\* cited by examiner

ICE SHAVING MACHINE

CROSS-REFERENCE TO RELATED APPLICATIONS

This application claims the benefit of U.S. Provisional Application No. 62/692,596, filed Jun. 29, 2018, titled, "ICE SHAVING MACHINE," and each of which are hereby incorporated by reference herein in their entirety, including but not limited to those portions that specifically appear hereinafter, the incorporation by reference being made with the following exception: In the event that any portion of the above-referenced applications is inconsistent with this application, this application supersedes the portion of the above-referenced applications.

BACKGROUND

Frozen confections have become increasingly popular and desired in more and more settings. Machines for conditioning the ice used in frozen confections are typically large and of commercial grade in order to accommodate the commercial settings in which they are used. However, often frozen confections are desired in a commercial or home environment or small party setting where portability and storage are desired. What is needed is a frozen confection machine that is portable, provides convenient operation and good performance, and is sized for easy storage.

This disclosure relates generally to machines for preparing shaved ice confectioneries, and more particularly, but not necessarily entirely, to a cube, chunk or block ice shaver that is particularly adapted for producing a light, fluffy, finely textured shaved ice, or powdered snow-like flavored food products.

A variety of machines have been developed, described and are widely known for creating or processing cold deserts and confectioneries by processing ice into more appealing eatable forms, such as snow cones and shaved ice. Such devices produce either ice granules (snow cones) or light, fluffy, finely textured shaved ice for subsequent flavoring using syrups.

Despite the advantages of shaved ice machines that are available in the marketplace, improvements are still being sought. Machines in the marketplace may have limitations such as, cumbersome ice cube or ice block change procedures, frozen and impacted blades, blades that do not produce light, fluffy, finely textured shaved ice, and may produce inconsistent shaved ice textures because the feeding of the ice into a blade is inconsistent or because the machine cannot adapt to the changing consistency of the ice as it begins to warm and melt.

Further, such machines may not be able to accommodate the changes in the texture of the ice as the ice begins to warm. As ice begins to warm and changes from a very cold state to a warmer state, the texture and consistency of the ice to be shaved by a machine begins to change. As the ice warms, the texture of the ice begins to degrade and the quality of the shaved ice decreases making it more difficult for the machine to shave the warm ice, or at least the ability to provide a high quality shaved ice product is decreased because of the interaction between the blade of the machine and the ice.

Machines in the marketplace may thus be characterized by several disadvantages that may be addressed by the disclosure. The disclosure minimizes, and in some aspects eliminates, the above-mentioned failures, and other problems, by utilizing the methods and structural features described and illustrated herein.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
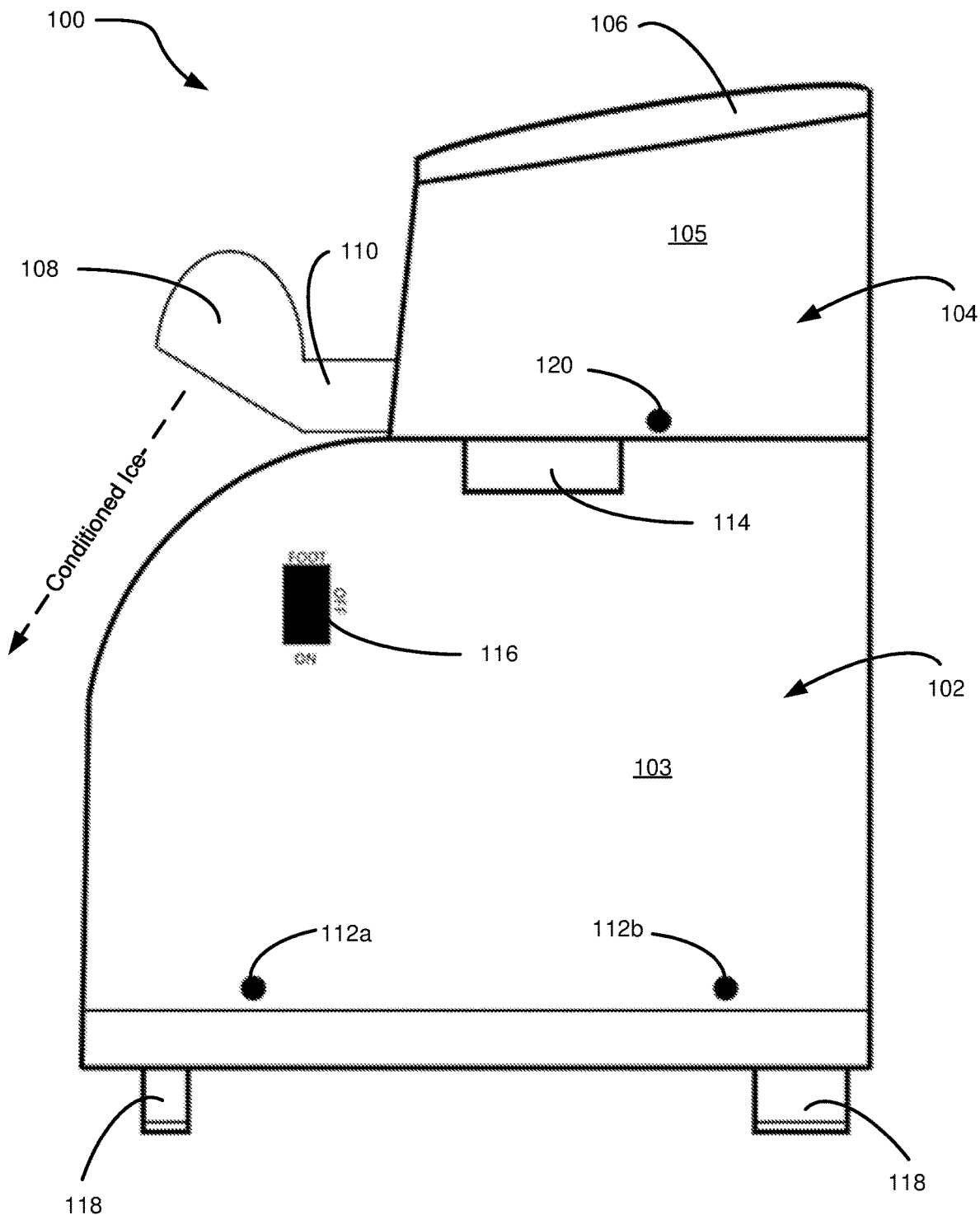
FIG. 1 illustrates a side view of an embodiment of a device for producing a shaved ice confection.

The disclosure extends to apparatuses, methods, and systems, for producing frozen confections and conditioning ice for use in frozen confections such as shaved ice or snow cones. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

An embodiment of the disclosure is an ice shaving machine for conditioning ice for use in a frozen confection. The ice shaving machine is configured to condition cubed ice, chunks of ice, and/or blocks of ice to produce a powdery snow-like texture that may be consumed as a frozen confection. The frozen confection (may be referred to as a snow cone or shaved ice) may be served with flavored syrups or other toppings. The frozen confection has a unique snow-like texture that is desirable as a frozen dessert.

The ice shaving machine is configured to receive cubes, chunks, and/or blocks of ice. For purposes of this disclosure, an ice cube, chunk, or block is defined as a generally homogenous solid body or mass of ice that may be placed inside a user's cup to cool a drink. These ice cubes, chunks, or blocks as discussed herein may be smaller than the large bricks of ice that are typically used by frozen confection machines. In some implementations, and particularly when the device is used by consumers who do not have access to large commercial bricks of ice, it is desirable that the frozen confection machine can accept smaller cubes of ice that may be purchased at a store or prepared in a residential freezer.

In an embodiment, the ice cubes, chunks, or blocks are placed in a feeder of the ice shaving machine. The feeder causes the ice to come in contact with a blade. The blade shaves off very thin slices of ice. A collector collects the very thin slices of ice and moves those thin slices of ice to a spout, under which a container may be placed to receive the thin slices of ice. Once the container is sufficiently full, syrups or flavorings may be added to the ice through an integrated flavor dispensing system or from an individual flavor container from a standalone flavor station having a plurality of containers.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for producing frozen confections are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

The disclosure discloses an ice shaving machine for receiving cubes, chunks, or blocks of ice and producing a powdery snow-like textured cup or container of shaved ice to which a confection, such as a syrup or flavoring, may be added. It should be noted that for the purposes of this disclosure an ice cube, chunk or block is defined as a generally homogenous solid body or mass of ice that may be placed inside of a user's cup to cool a drink. The ice cubes, chunks or block may be placed in a feeder, which permits the ice to come into contact with a blade. The blade shaves off paper-thin slices of ice. A collector collects the paper-thin slices of ice and moves it to a spout, under which a container is placed to receive the slices of ice. Once the container is sufficiently full, syrups or flavorings may be added, either through an integrated flavor dispensing system or from an individual flavor container or from a stand-alone flavor stations having a plurality of containers. This disclosure has various embodiments and alternative blade designs, which are shown in full detail in the figures.

Referring now to the figures, FIG. 1 is a side view of an implementation of a device 100 for producing a frozen confection such as shaved ice or a snow cone. The device 100 is configured for conditioning a plurality of pieces of ice such as ice cubes or chunks of ice. The device 100 includes a base portion 102 having a base housing 103. The device 100 further include an ice conditioning portion 104 having an ice conditioning housing 105. The base portion 102 includes a plurality of feet 118 for supporting the device 100. The base portion 102 includes a venting channel 114 for releasing heat produced by a motor disposed within the base portion. The venting channel 114 may further serve as a grip or handle for lifting the device 100. The venting channel 114 may be integrated into the base housing 103. The ice conditioning portion 104 includes a spout 110 and an ice shaper 108. The ice conditioning portion 104 includes a lid 106 for covering a receptacle where unconditioned ice is received by the ice conditioning portion 104. The base portion 102 includes fasteners 112a, 112b for securing an upper portion of the base housing 103 to a lower portion of the base housing 103. The ice conditioning portion 104 includes locking mechanism 120 for securing the ice conditioning portion 104 to the base portion 102 and locking the ice conditioning portion 104 thereon.

The base portion 102 includes a motor and a blade assembly base. The blade assembly base supports and may lock on to a blade assembly that is disposed within the ice conditioning portion 104. The blade assembly base includes a hole disposed therein that serves as a drive shaft receiver. The drive shaft receiver of the blade assembly base receives a drive shaft from the motor the locks into the blade assembly. The base portion 102 includes a control mechanism switch 116 that may be turned to activate or deactivate the motor disposed in the base portion 102. The motor may be turned to a continuous on position or a continuous off position. The motor may also be turned to a foot pedal-activated position such that the motor can be activated or deactivated by a foot pedal.

In an embodiment, the base housing 103 is constructed of an injection molded polycarbonate material. The base housing 103 may be constructed of injection molded plastic that is sufficiently rigid to support the motor disposed within the base portion 102 and the blade assembly disposed within the ice conditioning portion 104. The base housing 103 may include multiple vertical side portions, a horizontal top portion, and/or a horizontal base portion. In an embodiment, the base housing 103 is constructed of injection molded plastic and include four vertical side portions and a horizontal top portion. The base housing 103 further includes notches or grips for connecting into a base that includes the feet 118.

The venting channel 114 may include ribbing or channels disposed within the base housing 103 that permit heat to be released from within the base portion 102 and/or the ice conditioning portion 104. Heat may be generated by the motor disposed within the base portion 102 and it can be important to ensure most heat is released to prolong the lifespan of the motor and to further prevent conditioned ice from melting. The venting channel 114 may constitute an opening or divot within the base housing 103. In an embodiment, the base housing 103 is constructed of injection molded plastic and the venting channel 114 is a divot disposed within the side of the base housing 103. The venting channel 114 may be a hole disposed within the side of the base housing 103 such that air can escape the base portion 102. In the embodiment where the venting channel 114 is a hold disposed within the base housing 103, the venting channel 114 may be sized sufficiently for a user to dispose a hand through the hole to lift the device 100.

The ice conditioning portion 104 includes an ice conditioning housing 105. The ice conditioning housing 105 may be formed of an injection molded polycarbonate material such that it is sufficiently rigid for holding continuously agitated ice cubes. The ice conditioning housing 105 may form a receptacle for receiving a plurality of ice cubes or ice chunks to be conditioned into a frozen confection. A blade assembly may be disposed within the ice conditioning portion 104. In an embodiment, the blade assembly is not attached to the ice conditioning housing 105 but is attached to a drive shaft extending from the motor within the base portion 102 such that the blade assembly can spin freely within an interior space of the ice conditioning portion 104.

Figure 20A:
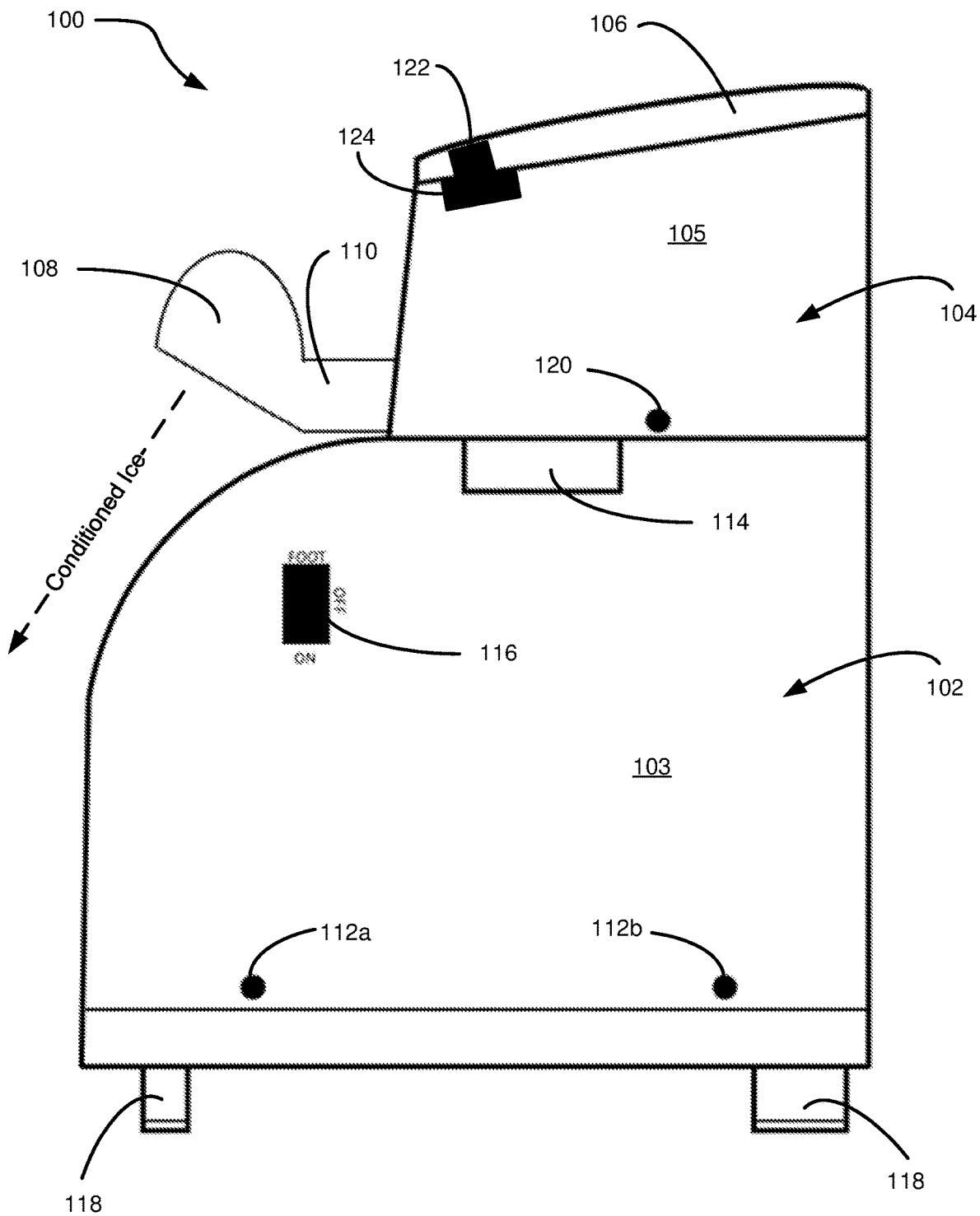
FIG. 20A illustrates a side view of an embodiment of a device for producing a shaved ice confection featuring magnetic components.
Figure 20B:
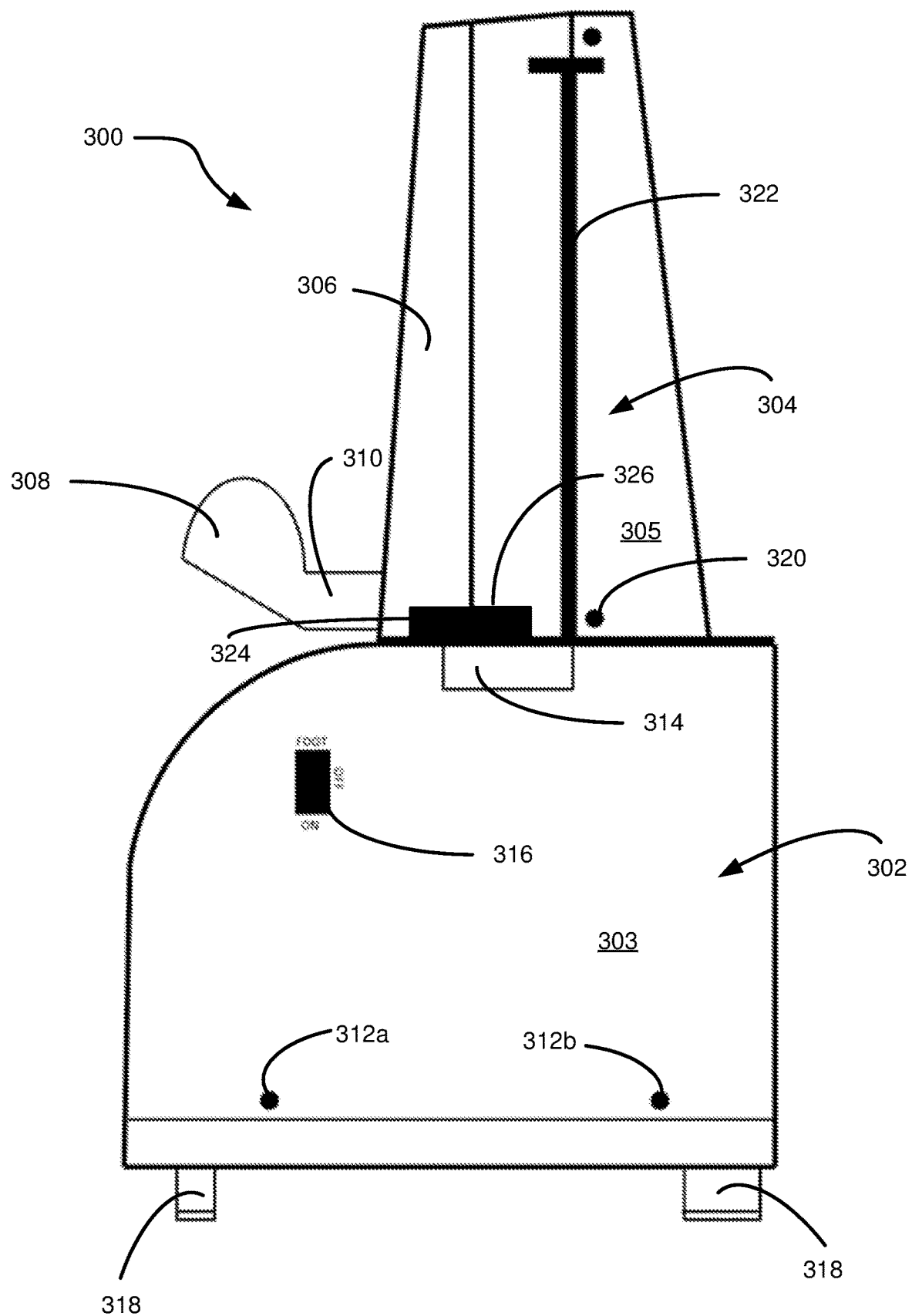
FIG. 20B illustrates a side view of an alternative embodiment of a device for producing a shaved ice confection featuring magnetic components.

The ice conditioning portion 104 includes a lid 106 that may be a separate piece and may be hinged to a wall of the ice conditioning housing 105. The lid may include a magnet (seen best in FIG. 20A, item 122 and FIG. 20B, item 324) configured to mate with a corresponding magnet (seen best in FIG. 20A, item 124 and FIG. 20B, item 326) attached to the ice conditioning housing 105. The paired magnets may provide some force to keep the lid shut when ice is being agitated within the ice conditioning portion 104. The lid 106 may further include a spring and/or rod assembly that is in mechanical communication with an actuator for activating and deactivating the motor. The spring and/or road assembly may cause the motor to be deactivated when the lid is opened. This assembly may serve as a "failsafe" to ensure that the motor does not turn (and therefore, that ice is not agitated within the ice conditioning portion 104) when the lid 106 is in an open position.

For example, during use the device 100 may be positioned on a work surface. A user may then lift the lid 106 to expose the hopper within the ice conditioning portion 104, and ice may then be introduced into the hopper. The lid 106 may then be closed and held down by the locking mechanism 120, a user's hand, or other mechanism thereby actuating the switch to turn on the motor. The switch may include a rocker switch that provides an upward bias using a spring or other biasing mechanism, such that the lid 106 moves away from a closed or fully closed position when downward pressure is not applied and/or the locking mechanism 120 is not secured. The motor then turns the paddle of a blade assembly to drive ice into the blade or drive the blade. The ice is conditioned as it moves through the blade and into the spout 110 and ice shaper 108. The conditioned ice may then be delivered to a cup, or other container as may be desired by a user, and shaped by the ice shaper 108, and a flexible hand shaping flat, resulting in cup or container full of conditioned ice or product, which may have a pleasingly shaped top. For example, ice within the hopper may be too large to pass through an opening or blade covering an opening near the spout 110. Only after the ice is conditioned (chopped, shaved, turned into "snow," or otherwise conditioned) is it able to pass from an interior of the hopper and out through the spout 110 into a cup.

The ice conditioning portion 104 includes a spout 110 and an ice shaper 108. The spout 110 may be connected to the ice shaper 108 such that the spout 110 and the ice shaper 108 are a single piece of material. The ice shaper may have a dome shape for shaping conditioned ice to have a dome-shaped top. It should be appreciated the ice shaper 108 may have any suitable shape and may particularly have a dome shape if it is desirable that the conditioned ice has a dome shape. The ice shaper 108 may impart a shape to a final shaved ice product so that little or no additional shaping needs to be performed by a user. In an implementation, and additional flexible hand shaping flap may be included, which allows users more options for shaping during use without having to come into contact with the edible conditioned ice product. The flexible shaping flap may be attached below or near the spout as illustrated.

Figure 2:
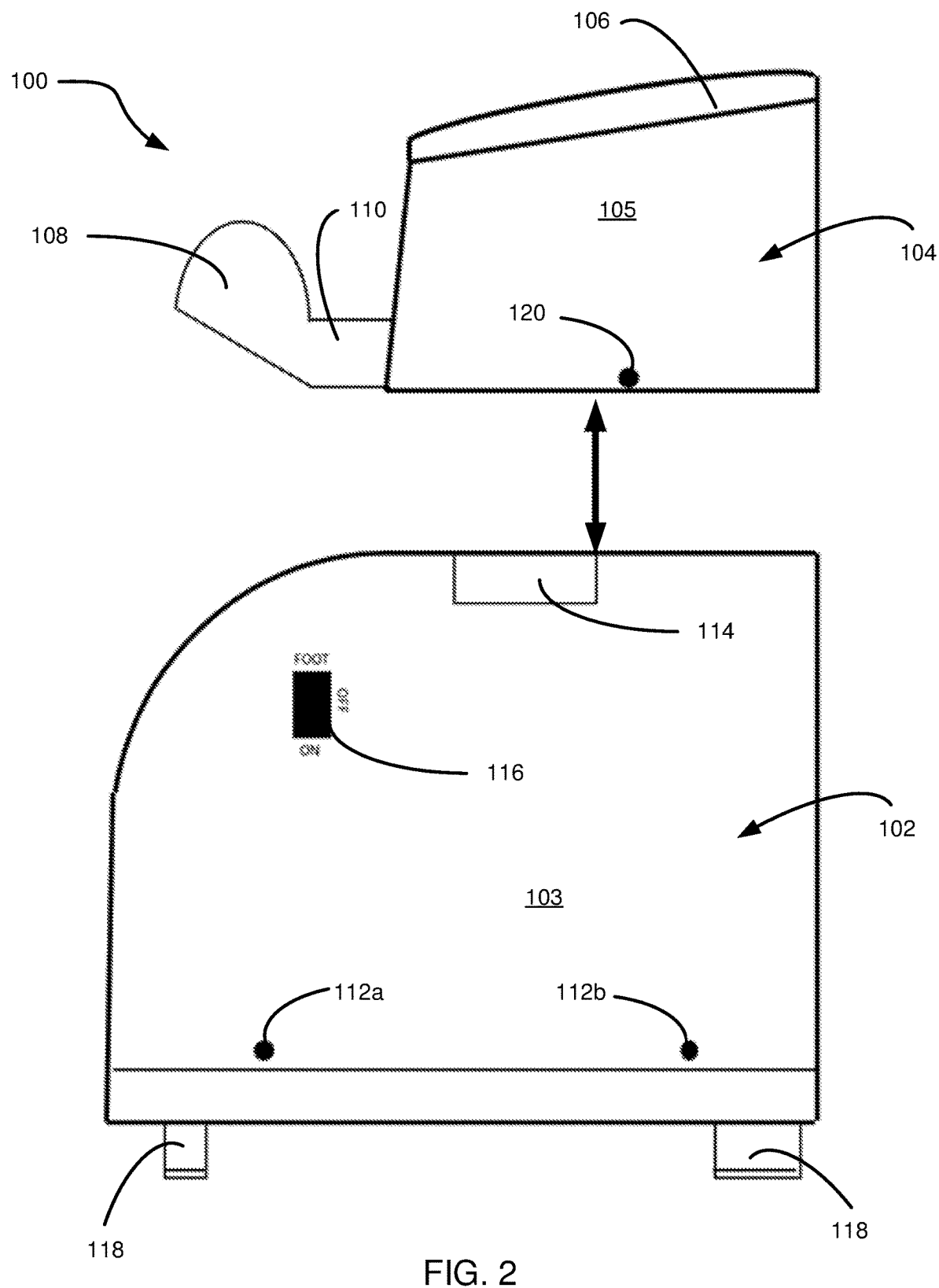
FIG. 2 illustrates an exploded view of an embodiment of a device for producing a shaved ice confection.

FIG. 2 is an exploded side view of a device 100 for producing a frozen confection. FIG. 2 illustrates that the ice conditioning portion 104 may be removably attached to the base portion 102. In an embodiment, the locking mechanism 120 is configured to secure and lock the ice conditioning portion 104 to the base portion 102.

Figure 3A:
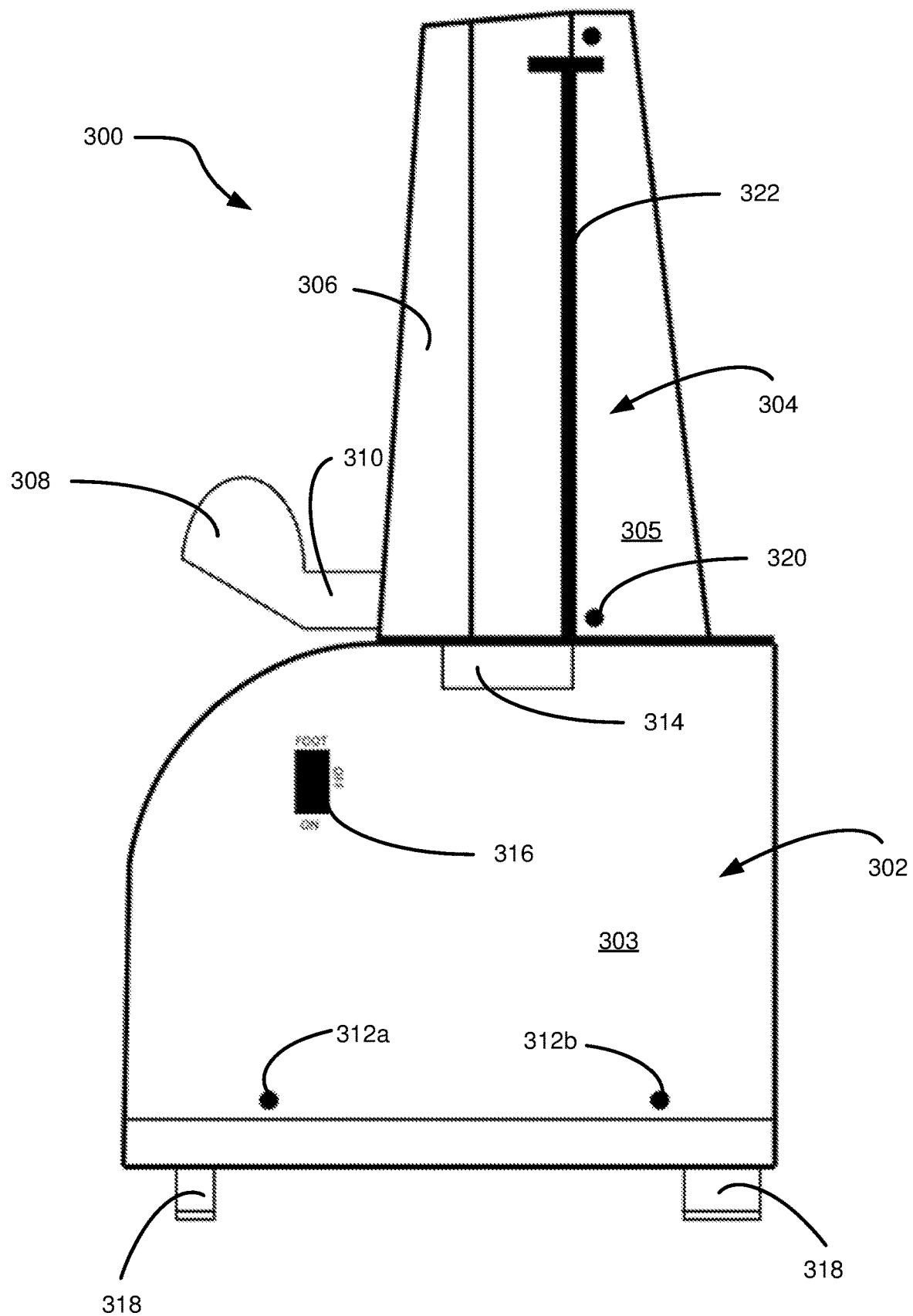
FIGS. 3A-4 illustrates side views of an embodiment of a device for producing a shaved ice confection.

FIG. 3A is a side view of a device 300 for producing a frozen confection. The device 300 is configured for conditioning a block of ice. In an embodiment, the device 300 is configured to condition a single large block of ice or a small number of blocks of ice. The device 300 includes a base portion 302 having a base housing 303. The device 300 further include an ice conditioning portion 304 having an ice conditioning housing 305. The base portion 302 includes a plurality of feet 318 for supporting the device 300. The base portion 302 includes a venting channel 314 for releasing heat produced by a motor disposed within the base portion. The venting channel 314 may further serve as a grip or handle for lifting the device 300. The venting channel 314 may be integrated into the base housing 303. The ice conditioning portion 304 includes a spout 310 and an ice shaper 308. The ice conditioning portion 304 includes a lid 306 for covering a receptacle where unconditioned ice is received by the ice conditioning portion 304. The base portion 302 includes fasteners 312a, 312b for securing an upper portion of the base housing 303 to a lower portion of the base housing 303. The ice conditioning portion 304 includes locking mechanism 320 for securing the ice conditioning portion 304 to the base portion 302 and locking the ice conditioning portion 304 thereon.

Figure 3B:
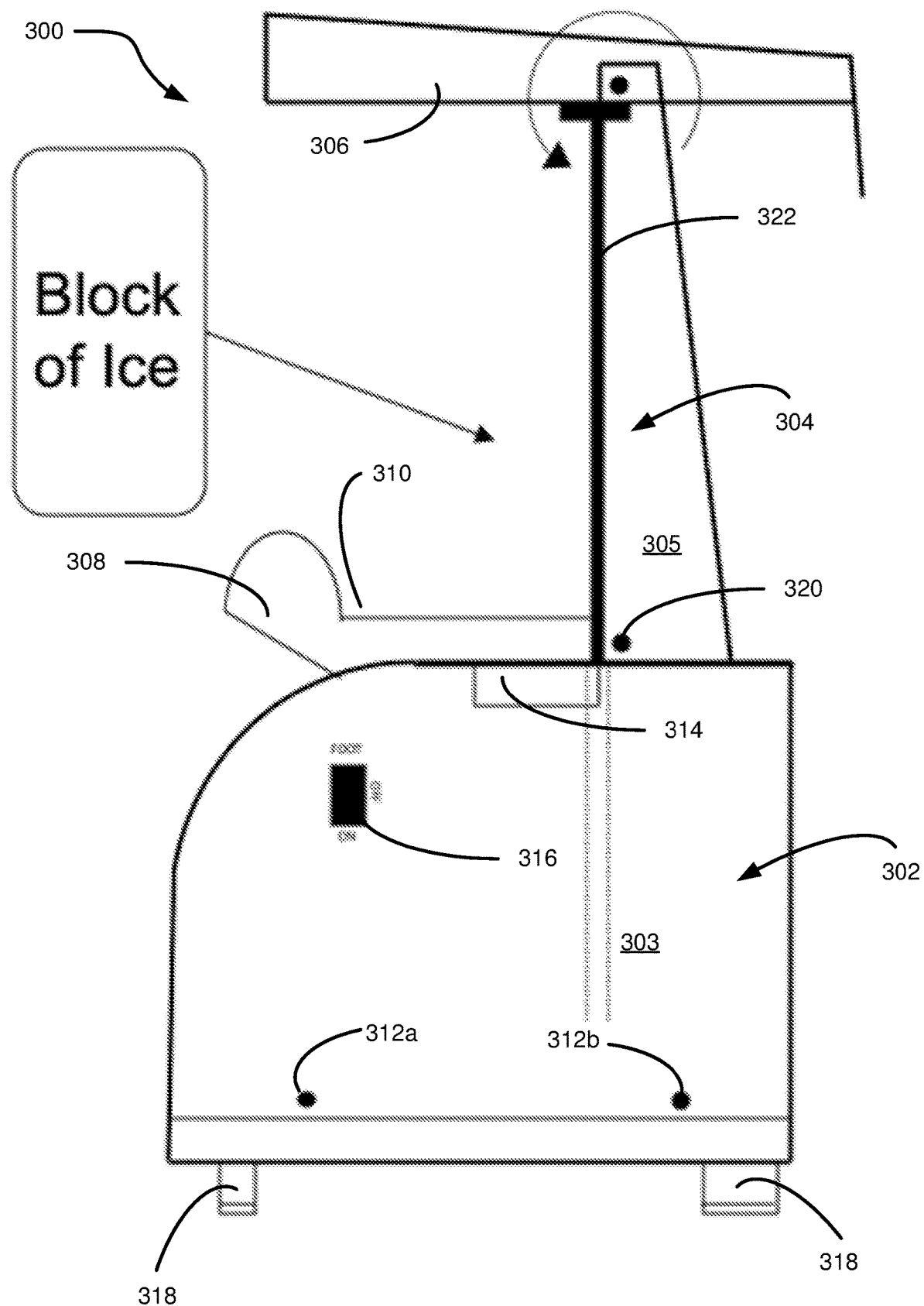

In the embodiment of the device 300 shown in FIG. 3A, the ice conditioning portion 304 further includes an arm 322 for pressing a block of ice into a blade assembly disposed in the ice conditioning portion 304. One or more large blocks of ice may be disposed within the ice conditioning ice housing 305 such that the lid 306 may be lifted and closed around the one or more large blocks of ice. The one or more large blocks of ice may be depressed by the arm 322 to be conditioned by the blade assembly. The arm 322 may be spring loaded or may include some other mechanical mechanism such it automatically depresses the one or more large blocks of ice without user intervention. FIG. 3B illustrates how the block of ice may be disposed within the interior space of the ice conditioning portion 304 by lifting the lid 306.

Figure 4:
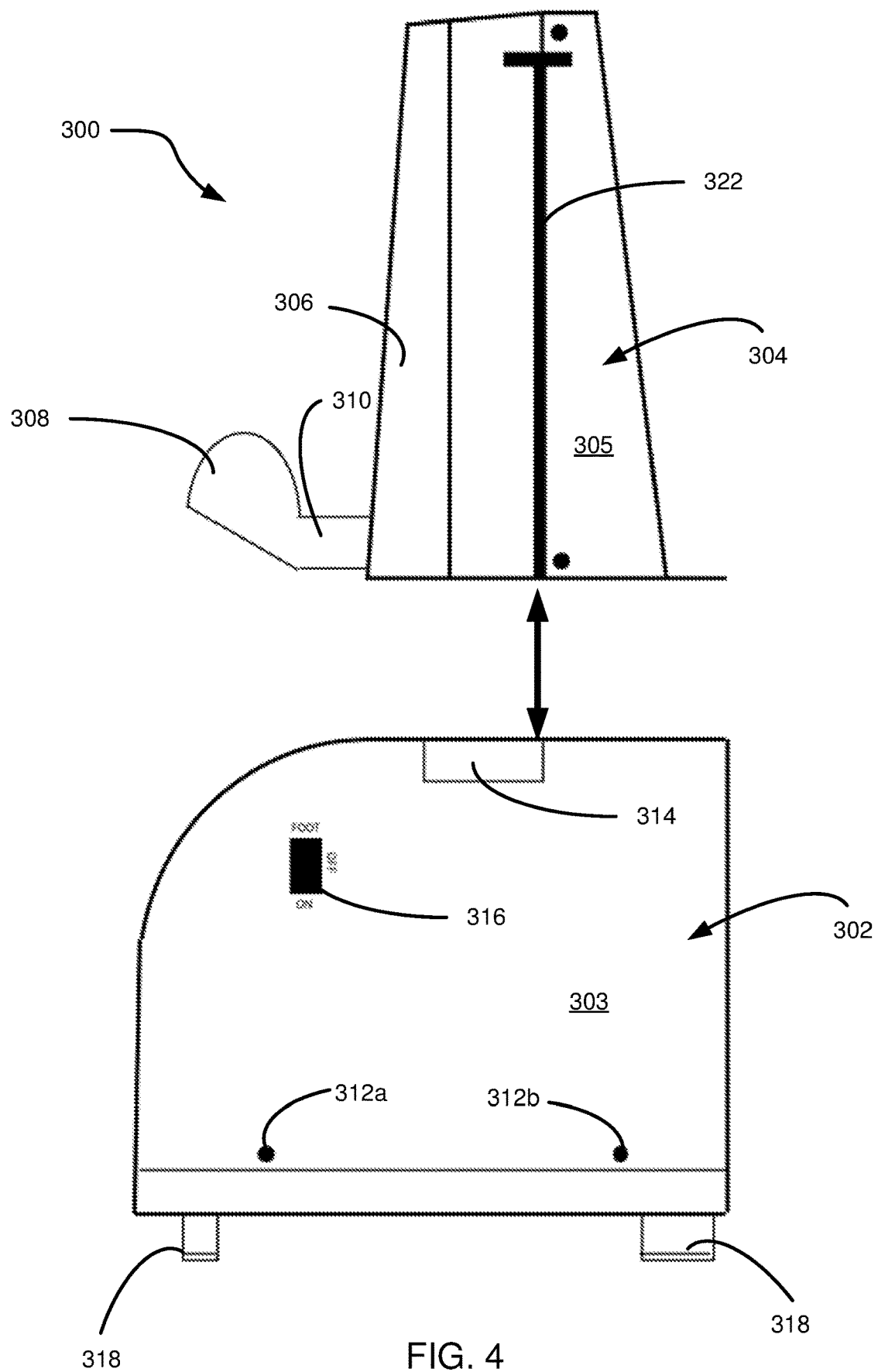

FIG. 4 is an exploded side view of the device 300 for producing a frozen confection. FIG. 4 illustrates that the ice conditioning portion 304 may be removably attached from the base portion 302.

In an embodiment, the same base portion 302 may be used with either of the ice conditioning portion 104 that is first illustrated in FIG. 1 or the ice conditioning portion 304 that is first illustrated in FIG. 3. This provides significant manufacturing benefits because a single base portion 302 may be manufactured for multiple end uses, i.e. for conditioning large blocks of ice and for conditioning a plurality of ice cubes or chunks of ice. Additionally, a user may purchase a single base portion 302 to be used with multiple different ice conditioning portions 104, 304 so the user has the flexibility to condition blocks of ice and/or smaller ice cubes or chunks of ice. Additionally, in an embodiment where the base portion 102, 302 is constructed of injection molded plastic, there are significant manufacturing cost savings because a single mold may be used to produce the base portion 102, 302 for multiple embodiments of a device for producing a shaved ice confection.

Figure 5:
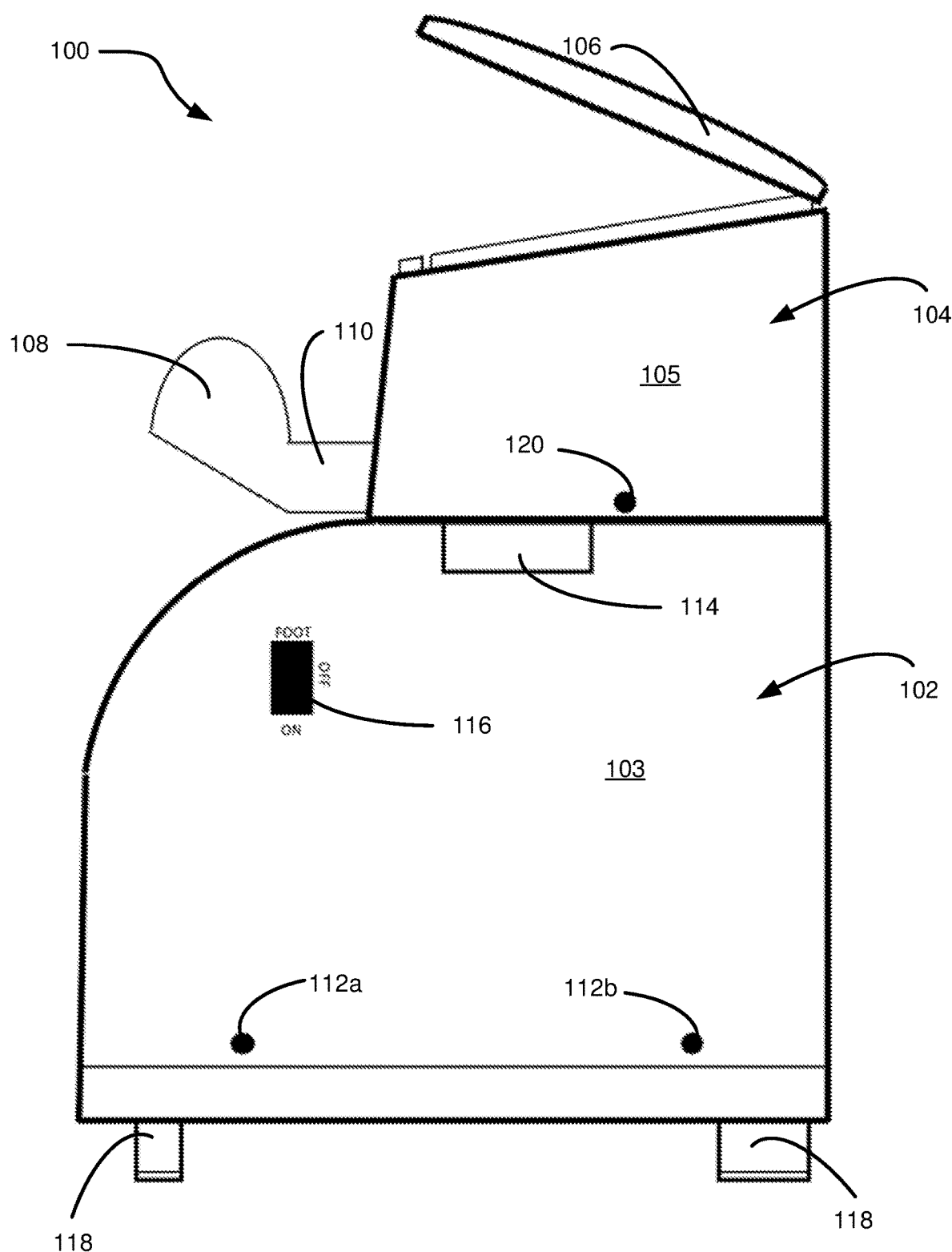
FIGS. 5-6 illustrates side views of an embodiment of a device for producing a shaved ice confection.

FIG. 5 illustrates a side view of the device 100 for producing a frozen confection. As shown in FIG. 5, the lid 106 of the ice conditioning portion 104 is lifted such that a plurality of ice cubes or chunks of ice may be disposed into the interior space of the base housing 105.

Figure 6:
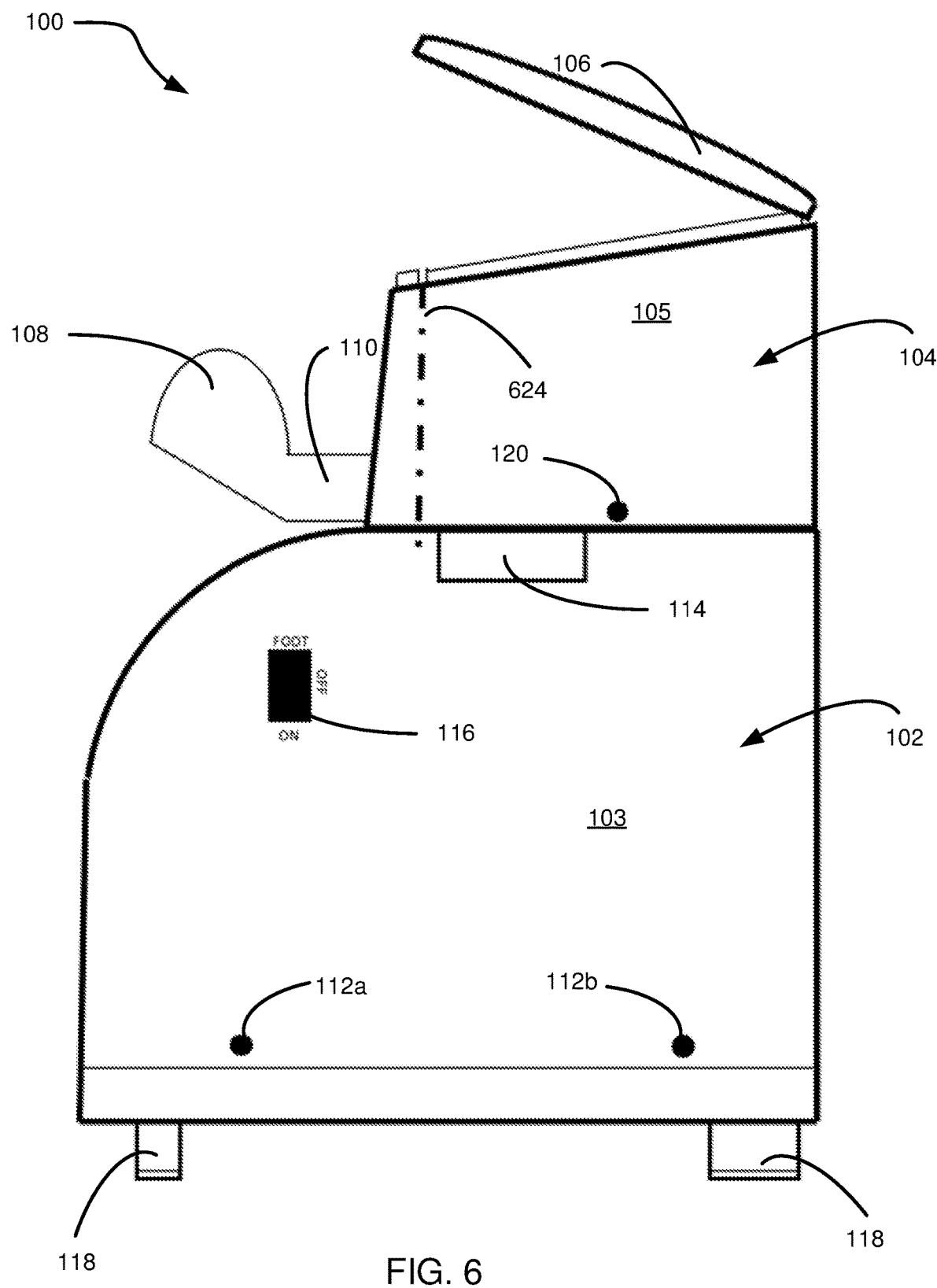

FIG. 6 illustrates a side view of the device 100 for producing a frozen confection. In the embodiment shown in FIG. 6, the device 100 includes a failsafe mechanism 624 for ensuring that the motor is deactivated when the lid 106 of the ice conditioning portion 104 is opened. In an embodiment, the failsafe mechanism 624 permits the motor to run when the lid 106 comes in contact with the rod or spring of the failsafe mechanism 624. In an embodiment, the rod or spring of the failsafe mechanism 624 comes in contact with a switch. When the switch is pressed by the failsafe mechanism 624, this indicates that the lid 106 is in a closed position and the motor is activated. When the switch is released, this indicates that the lid 106 is in an open position and the motor is deactivated.

Figure 7:
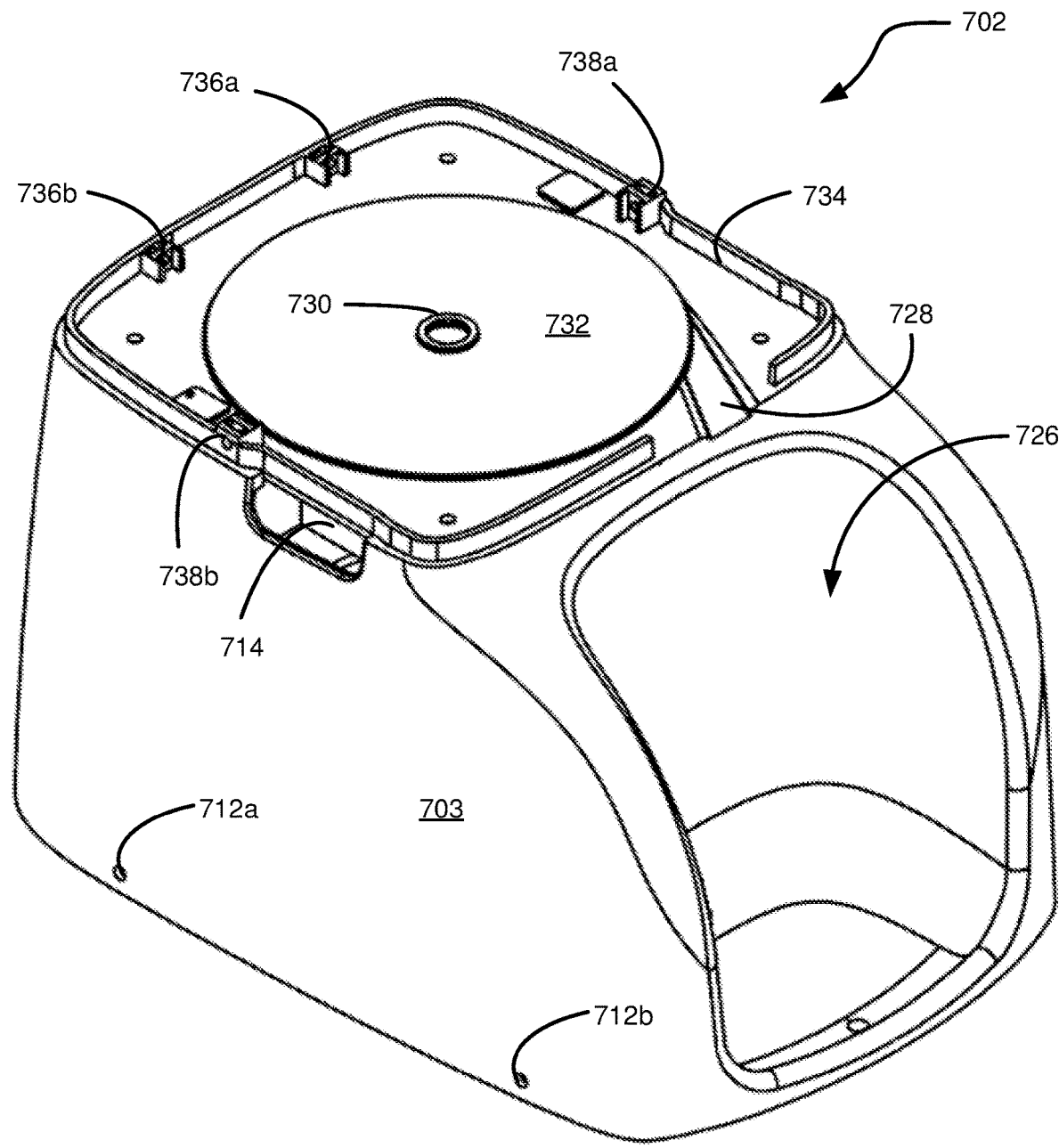
FIG. 7 illustrates a perspective view of a base portion of an embodiment of a device for producing a shaved ice confection.

FIG. 7 illustrates a base portion 702 of a device for producing a frozen confection. The base portion 702 includes a base housing 703 that may be constructed of a single piece of injection molded polycarbonate material. The base portion 702 includes a cup receptacle 726 where a cup may be placed or may rest when being filled with conditioned ice. The base portion 702 includes a venting channel 714 disposed in at least one upstanding sidewall of the base housing 703. The venting channel 714 may permit hot air generated by the motor to be released from the device 100, 300. This can greatly extend the lifespan of the motor and may further ensure that conditioned ice does not melt prematurely. The base portion 702 includes fasteners 712a, 712b for attached the base portion 702 to a platform or base that includes feet 118.

Figure 19:
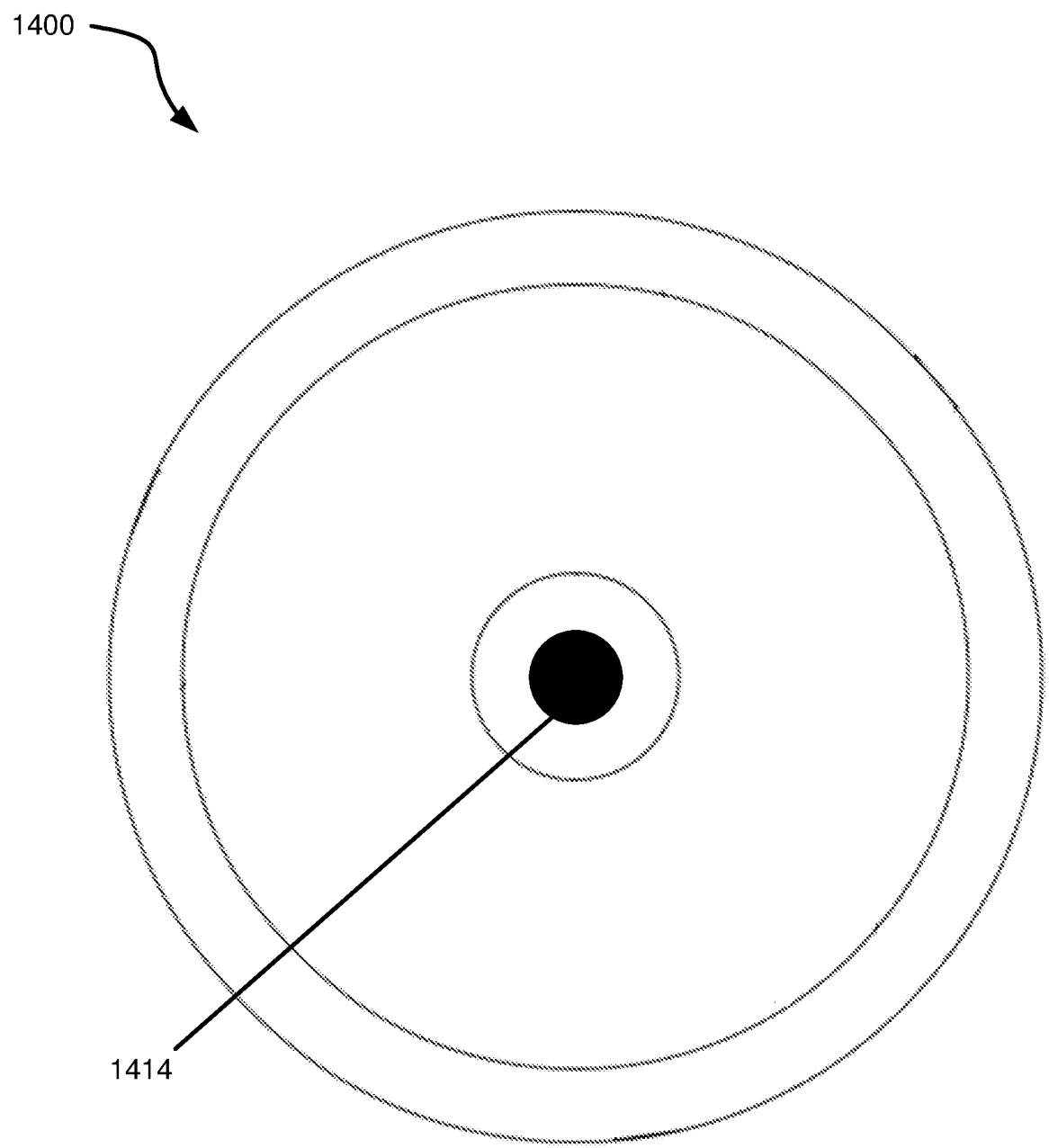
FIG. 19 illustrates an underside view of a paddle wheel of an embodiment of a device for producing a shaved ice confection.

The base portion 702 includes an upper surface that may include a blade assembly platform 732 for supporting a blade assembly. In an embodiment, the platform 732 includes raised sides such that the blade assembly can rest on the blade assembly platform 732 without moving or sliding around the base portion. The blade assembly may be a separate unit that is removable from the base portion 702 and/or the ice conditioning portion 104. The blade assembly may include a blade and/or a paddle. Each of the blade and/or the paddle may rest on the blade assembly platform 732. The blade assembly platform 732 includes a sidewall disposed within the upper surface of the base housing 703 that defines an opening 730 for receiving a drive shaft therethrough. The drive shaft may be connected to the motor and may form a mechanical connection from the motor to a paddle of the blade assembly or to a paddle wheel opening (see FIG. 19, item 1414). The base portion 702 further includes a channel 728 for pushing conditioned ice out of the device 100, 300 and into a container or cup that is placed in the cup receptacle 726 area.

The base portion 702 includes attachment structures 736a, 736b, 738a, 738b for attaching the base portion 702 to an ice conditioning portion 104, 304. The base portion 702 may include side attachment structures 738a, 738b located on parallel sides of the base portion relative to the cup receptacle 726 area. The base portion 702 may further include rear attachment structures 736a, 736b located at a rear side of the base portion 702 relative to the cup receptacle 726 area.

The base housing 703 includes an attachment sidewall 734 disposed upward and vertical relative to the blade assembly platform 732. The attachment sidewall 734 may be configured to receive or line up with a corresponding attachment sidewall located on a lower portion of an ice conditioning housing.

In an embodiment where the base housing 703 is constructed of a single piece of injection molded polycarbonate material, the base housing 703 may provide superior strength and durability compared with other implementations. The base housing 703 may be constructed that it is sufficiently rigid to house a motor that runs continuously for long period of times. The base housing 703 may further be constructed such that heat generated by the motor may be efficiently released from the base housing 703 through one or more venting channels.

Figure 8:
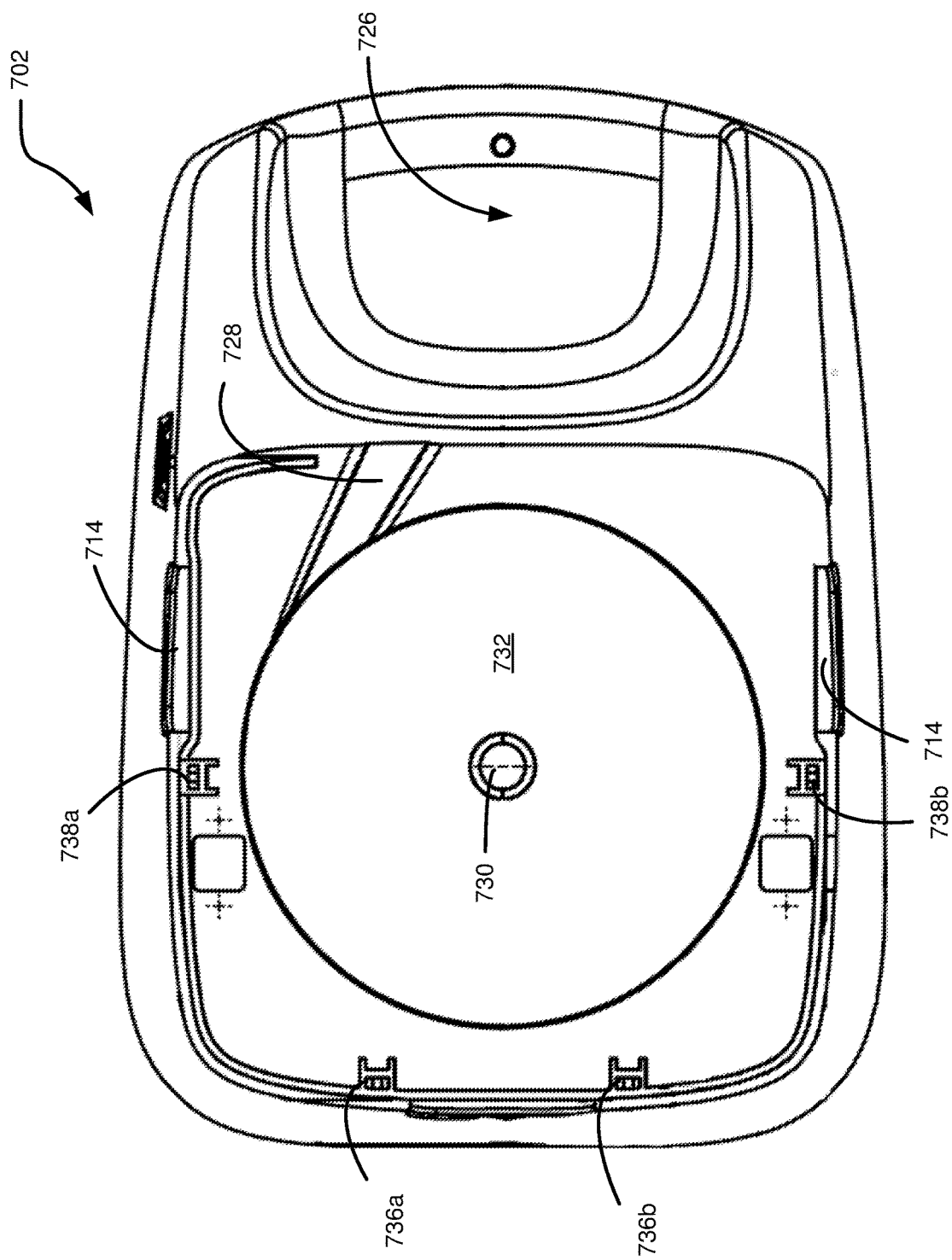
FIG. 8 illustrates an aerial top view of a base of an embodiment of a device for producing a shaved ice confection.

FIG. 8 illustrates an aerial top view of the base portion 702 as shown in FIG. 7.

Figure 9:
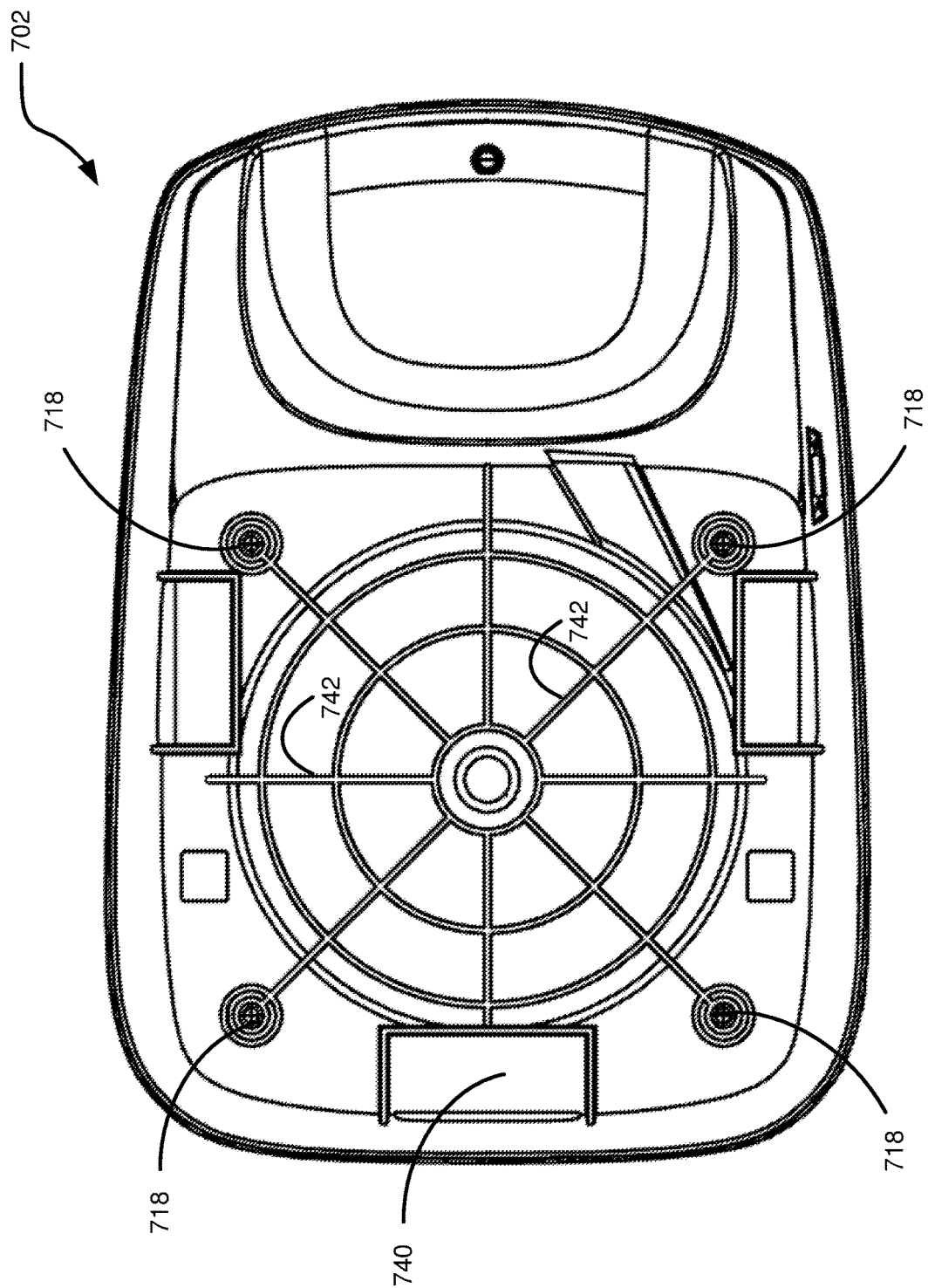
FIG. 9 illustrates a bottom view of a base of an embodiment of a device for producing a shaved ice confection.

FIG. 9 illustrates an aerial bottom view of the base portion 702 as shown in FIGS. 7-8. The base portion includes a handle groove 740 disposed within the base housing 703. The handle groove 740 may be a cutout or channel formed within the base housing 703 that is sized and shaped such that a user may place a hand within the handle groove 740 to lift the device 100, 300. The base portion 702 may include one or more feet 718 that are formed within a single piece of material forming the base housing 703 or may be removable attached to the base housing 703 or may be attached to an additional base portion that may be attached to the upper portion of the base housing 703. The base portion 702 may include a plurality of grooves 742 to provide structural rigidity and improved heat flow. The base portion 702 may include one or more venting channels disposed on the underside of the base housing 703 such that heat generated by the motor may be vented out of the base housing 703.

Figure 10:
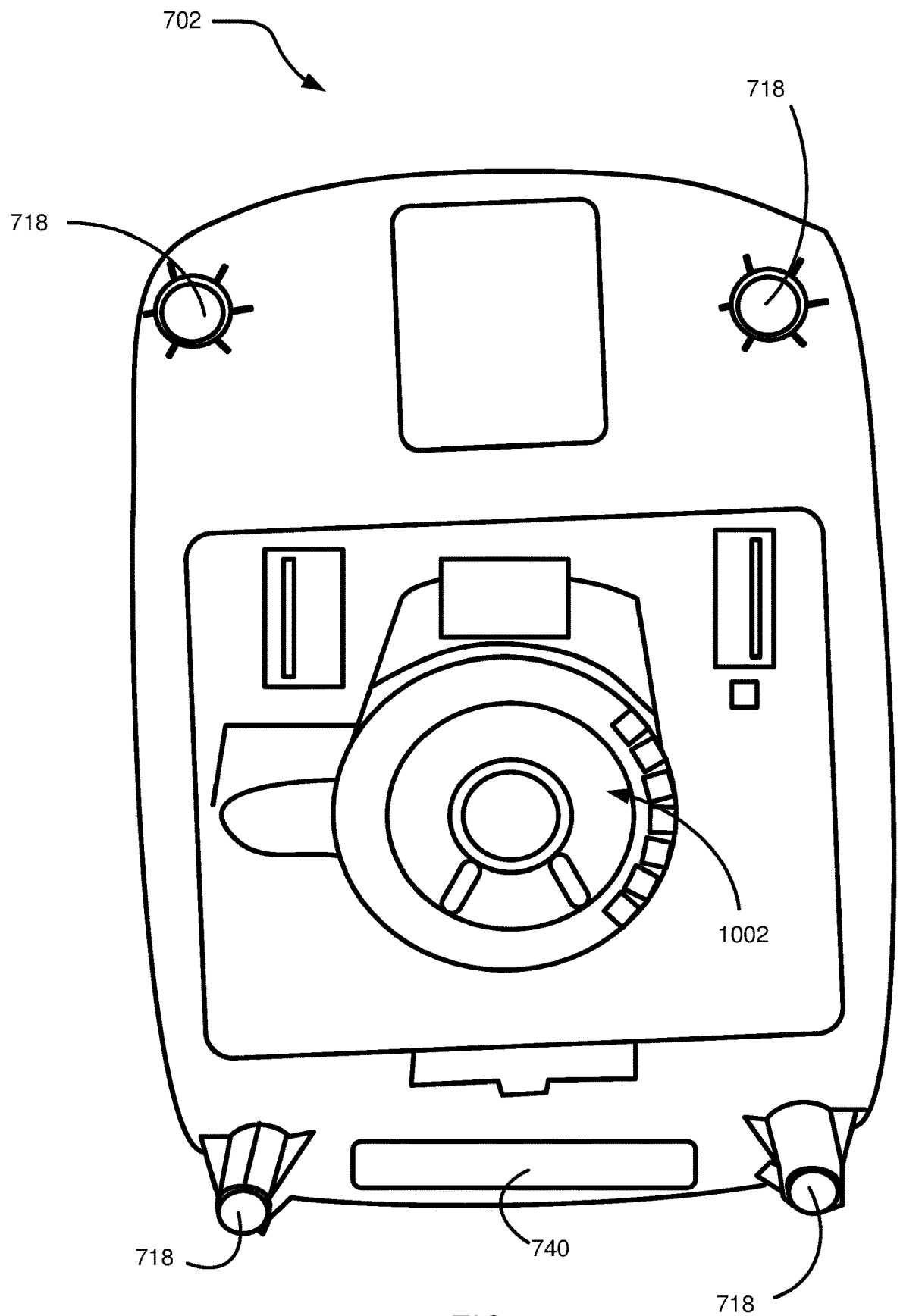
FIG. 10 illustrates a cutaway bottom view of an embodiment of a device for producing a shaved ice confection.

FIG. 10 is an aerial bottom view of a base portion 702 of a device for producing a frozen confection. A bottom of the base portion 702 is removed or cutaway such that the interior space of the base portion 702 may be seen. The interior space of the base portion 702 includes a motor 1002. In an embodiment, the motor 1002 includes a drive shaft that extends through a top side of the base portion 702. The motor 1002 is configured to spin a paddle wheel and/or a blade for conditioning ice.

The motor 1002 may be electric and may be driven by DC or AC current. An embodiment having a DC motor may be driven by a battery that may also be disposed within the housing. In an embodiment, the motor 1002 may be directly connected to a drive shaft that drives a paddle of the blade assembly thereby moving ice into a blade. The blade may be secured to a hopper that is configured to receive ice and push the ice to the blade assembly, such that the blade is stationary. It should be noted that in an embodiment the motor 1002 may drive a blade that spins in order to condition the ice. The motor 1002 may be disposed within the base housing 703, such that the motor's axis of rotation is generally aligned with the body of the base portion 702. Additionally, the axis of rotation of the paddle may also be generally aligned with the body of the machine. In an embodiment the housing 703 may further comprise a door for easily accessing the blade for maintenance. An embodiment may comprise a motor that is indirectly connected to paddle wheel through a device with a transmission or gearing.

In an embodiment the motor 1002 may be directly connected to a drive shaft that drives the paddle wheel thereby moving ice into a blade. It should be noted that in an embodiment the drive shaft may be connected to the paddle wheel with a shaft connector. The motor 1002 may be disposed within the housing such that the motor's axis of rotation is generally aligned with the body of the machine. Additionally, the axis of rotation of the paddle wheel may also be generally aligned with the body of the machine. In an embodiment, the housing may further comprise a door for easily accessing the blade for maintenance. For example, a door in the hopper or a sidewall near the blade may be selectively opened to access remove, and/or replace the blade. In one embodiment, no door is needed to access the blade as it may be accessed by releasing one or more fasteners, such as screws, to allow a hopper portion to be moved upward and access the blade from above.

Figure 11:
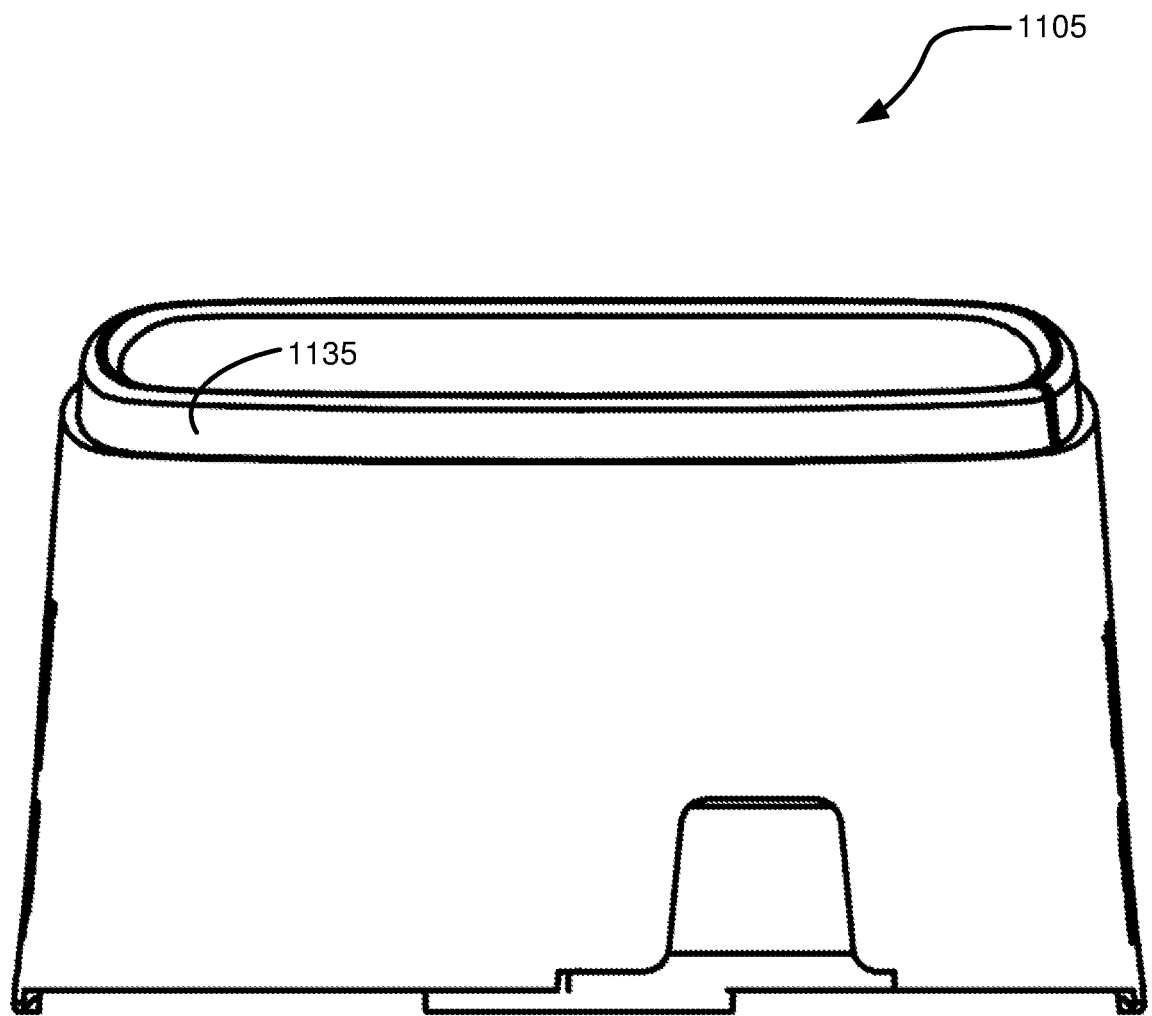
FIG. 11 illustrates a front view of an ice conditioning housing of an embodiment of a device for producing a shaved ice confection.

FIG. 11 illustrates a perspective view of an ice conditioning housing 1105 of a device for producing a frozen confection. The ice conditioning housing 1105 includes an upper lip 1135 disposed around the top surface. The upper lip 1135 may be configured to receive the lid 106 of the device 100 such that the lid 106 forms a tight seal around the upper lid 1135 to hold ice within the ice conditioning housing 1105.

In an embodiment, the ice conditioning housing 1105 serves as a receptacle for holding a plurality of ice cubes or chunks of ice that are waiting to be conditioning by a blade assembly into shaved ice. The ice conditioning housing 1105 may be sufficiently large that the blade assembly may freely spin within the interior space of the ice conditioning housing 1105.

Figure 12:
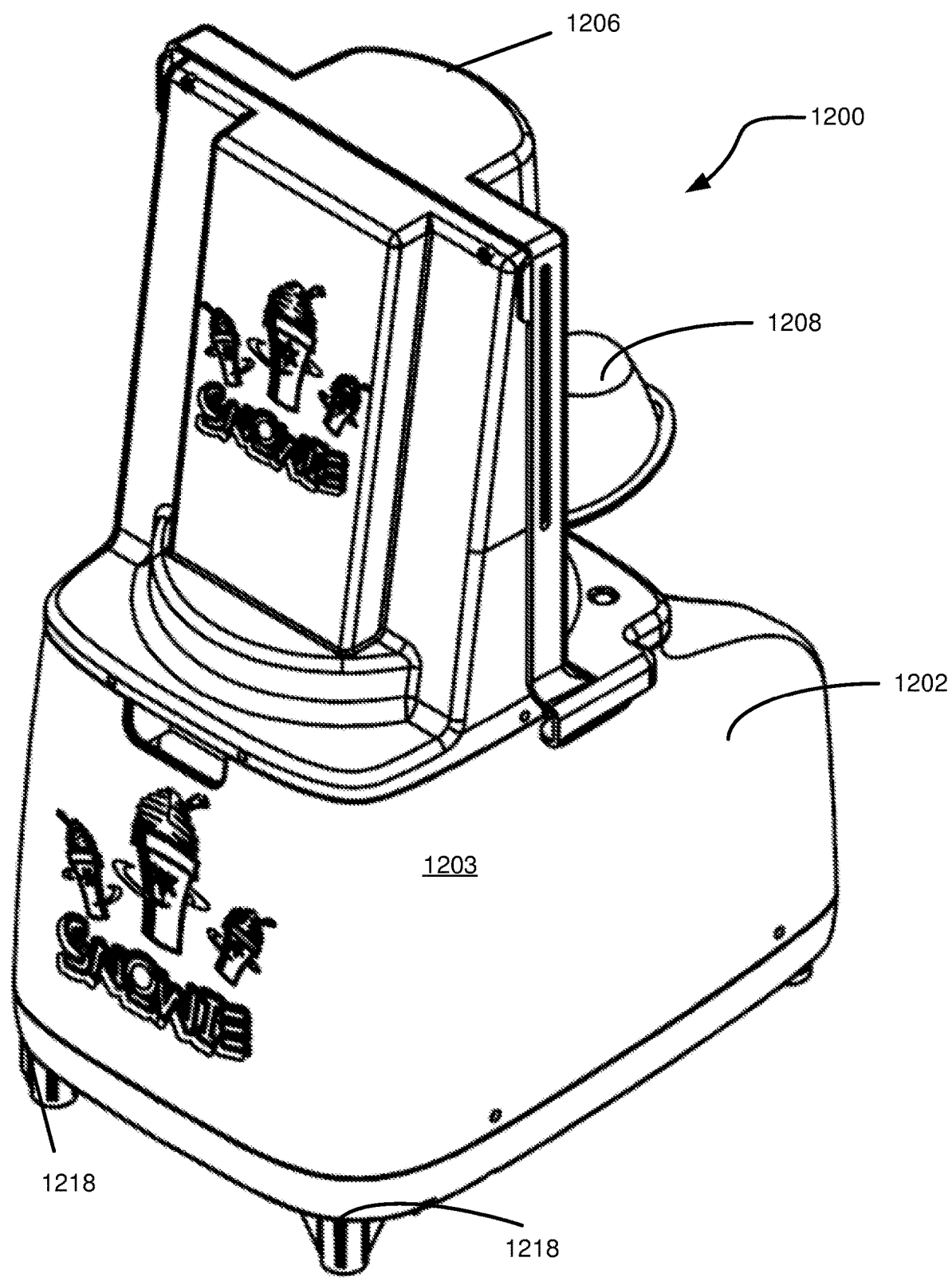
FIG. 12 illustrates a rear perspective view of an embodiment of a device for producing a shaved ice confection.
Figure 13:
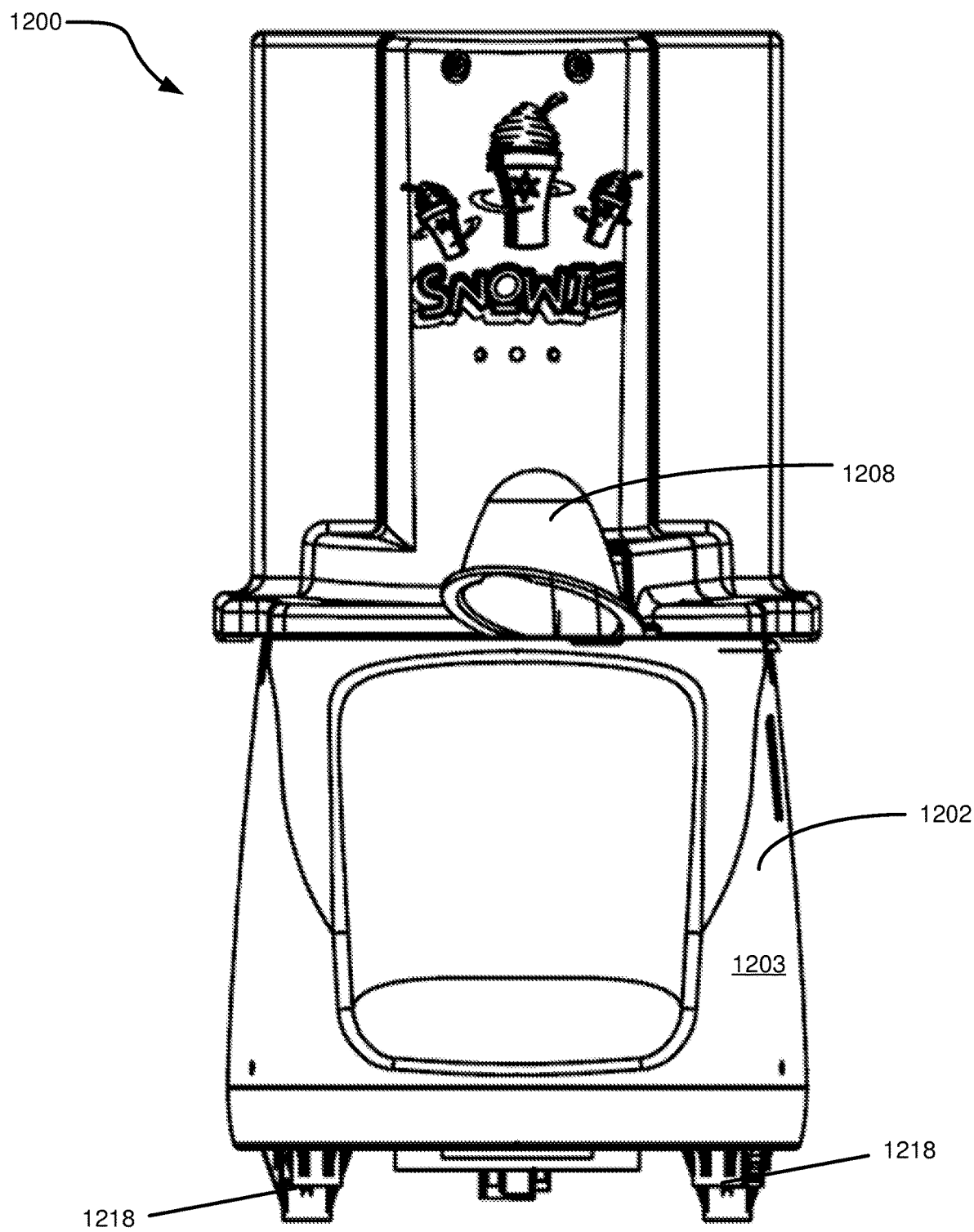
FIG. 13 illustrates a front view of an embodiment of a device for producing a shaved ice confection.

FIG. 12 is a perspective view of a device 1200 for conditioning ice into a frozen confection. FIG. 13 is a front view of the device 1200 for conditioning ice into a frozen confection. Similar to the device 300 first illustrated in FIG. 3, the device 1200 may be configured particularly for conditioning blocks of ice. The device 1200 includes a base portion 1202 having a base housing 1203. The base portion 1202 includes a plurality of feet 1218 for supporting the device 1200. The device includes a lid 1206 and an ice shaper 1208.

Figure 14:
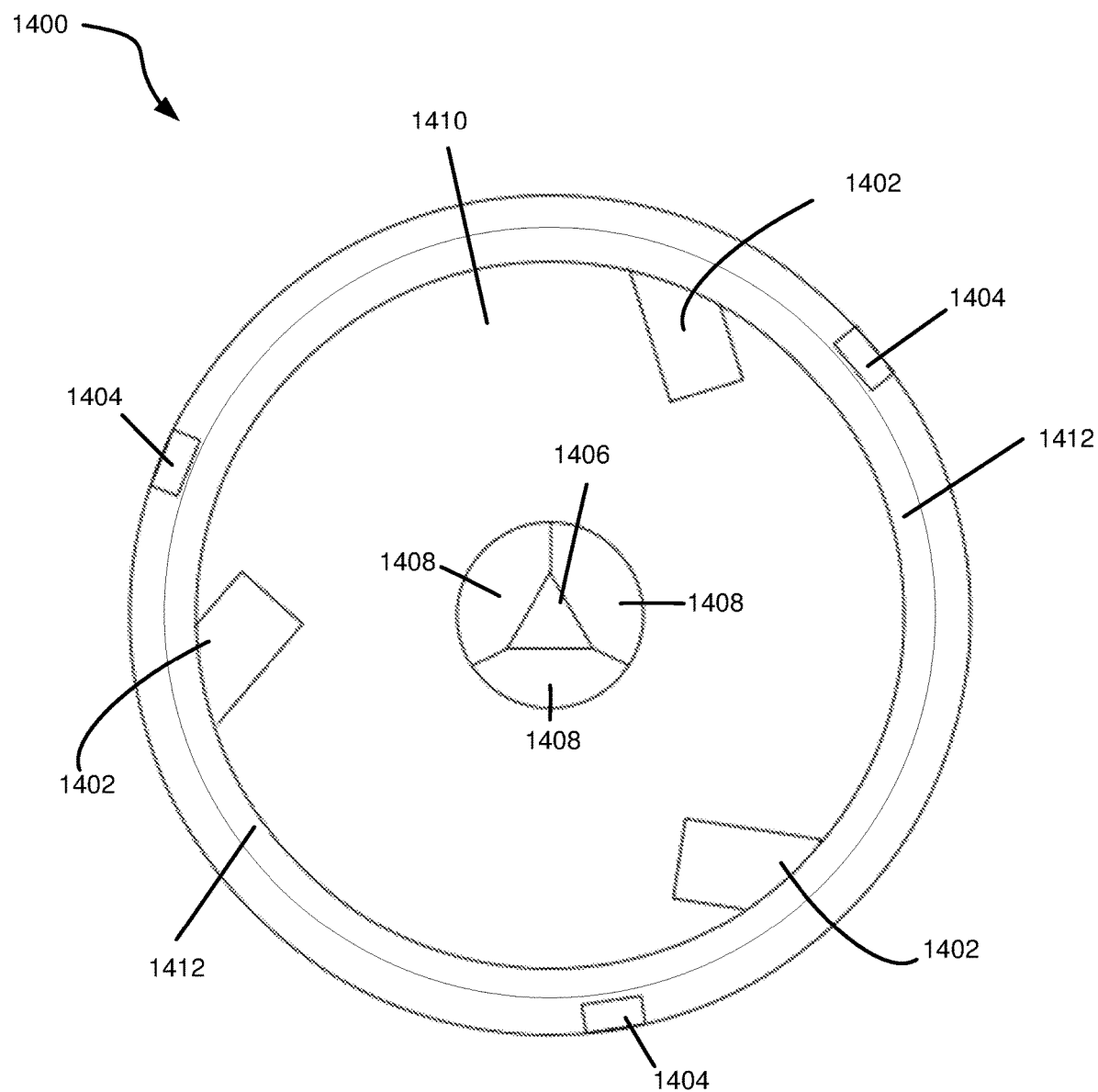
FIG. 14 illustrates a top view of a paddle wheel of an embodiment of a device for producing a shaved ice confection.

FIG. 14 illustrates an aerial view of a paddle wheel 1400. The paddle wheel 1400 includes a paddle wheelbase 1410 that may be disposed substantially normal with respect to a drive shaft extending from the motor 1002 (seen in FIG. 10) and interface with the motor 1002 via a paddle wheel opening 1414 (see FIG. 19). The paddle wheel 1400 includes a plurality of paddles 1402 extending substantially normal with respect to the paddle wheelbase such that the paddles 1402 are substantially normal with respect to the drive shaft extending from the motor 1002. The paddles 1402 are configured for pushing ice cubes and/or chunks of ice against the blade to be conditioned by the blade. The paddle wheel 1400 includes a plurality of ice collectors 1404 extending substantially normal with respect to the paddle wheelbase 1410 such that the ice collectors 1404 are substantially parallel with the paddles 1402. The ice collectors 1404 are configured for pushing conditioned ice around the paddle wheel 1400 until the conditioned ice is dispensed from the device through a spout. The paddle wheel 1400 includes an ice breaking mechanism 1406 for breaking ice cubes and/or chunks of ice into desirable sized pieces of ice to be conditioned by the blade. The ice breaking mechanism 1406 is further configured to prevent ice cubes and/or chunks of ice from melting and attaching to one another to form larger chunks of ice that are difficult to condition with the blade. The plurality of paddles 1402 and plurality of ice collectors 1404 may be spaced such that a groove 1412 may be formed between them.

The ice breaking mechanism 1406 includes a plurality of tapered portions 1408 extending from a middle portion of the ice breaking mechanism 1406 and tapering down to meet the paddle wheelbase 1410. The entirety of the paddle wheel, including the paddle wheelbase 1410, the ice breaking mechanism 1406 including the tapered portions 1408, the paddles 1402, and the ice collectors 1404 may be constructed of a single piece of injection molded polycarbonate material. In some implementation is may be highly desirable to construct the paddle wheel assembly of a polycarbonate material so that ice does not freeze to the surface of the paddle wheel assembly. In alternative embodiments, the paddle wheel assembly may be constructed of metal such as aluminum, and there may be issues with pre-conditioned ice and/or conditioned ice sticking to the paddle wheel assembly. Additionally, the single piece of injection molded polycarbonate material may be desirable because the paddle wheel assembly may be inexpensive and efficient to manufacture.

Figure 15:
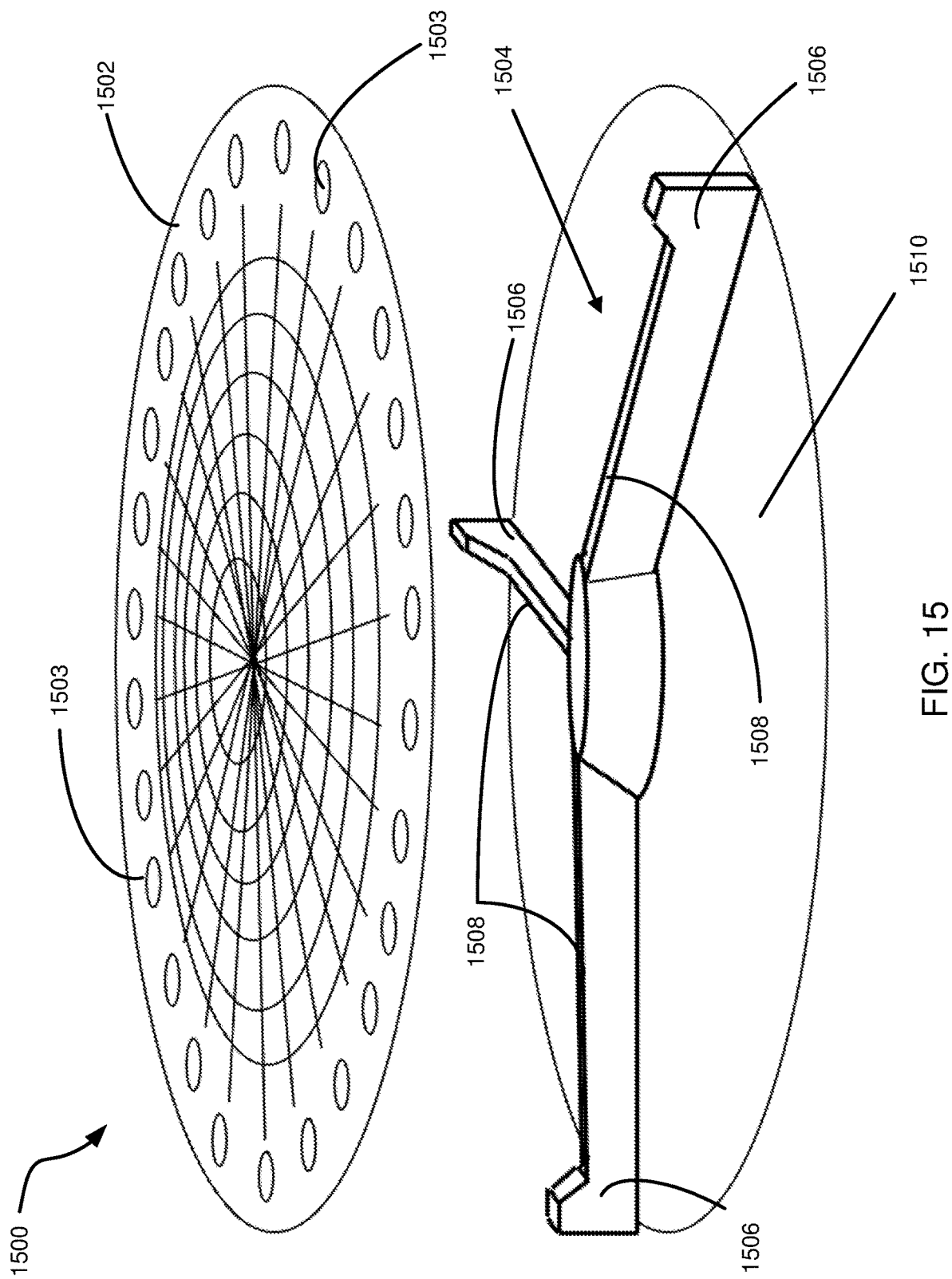
FIG. 15 illustrates a perspective view of a rotating blade assembly of an embodiment of a device for producing a shaved ice confection.

FIG. 15 illustrates a perspective view of a blade assembly 1500. The blade assembly includes a blade 1502 including a plurality of holes 1503 and grooves disposed therein configured for conditioning ice into a frozen confection. Fasteners may be disposed through the holes 1503 to attach the blade 1502 to the paddle wheel 1504 via raised ends of a plurality of paddles 1506 of the blade assembly 1500. The paddle wheel 1504 further includes a base 1510 and the plurality of paddles 1506. A channel 1508 may be formed by a space between an underside of the blade 1502 and a top surface of each of the plurality of paddles 1506 for receiving the blade 1502 when the blade 1502 is attached to the paddle wheel 1504.

Figure 16:
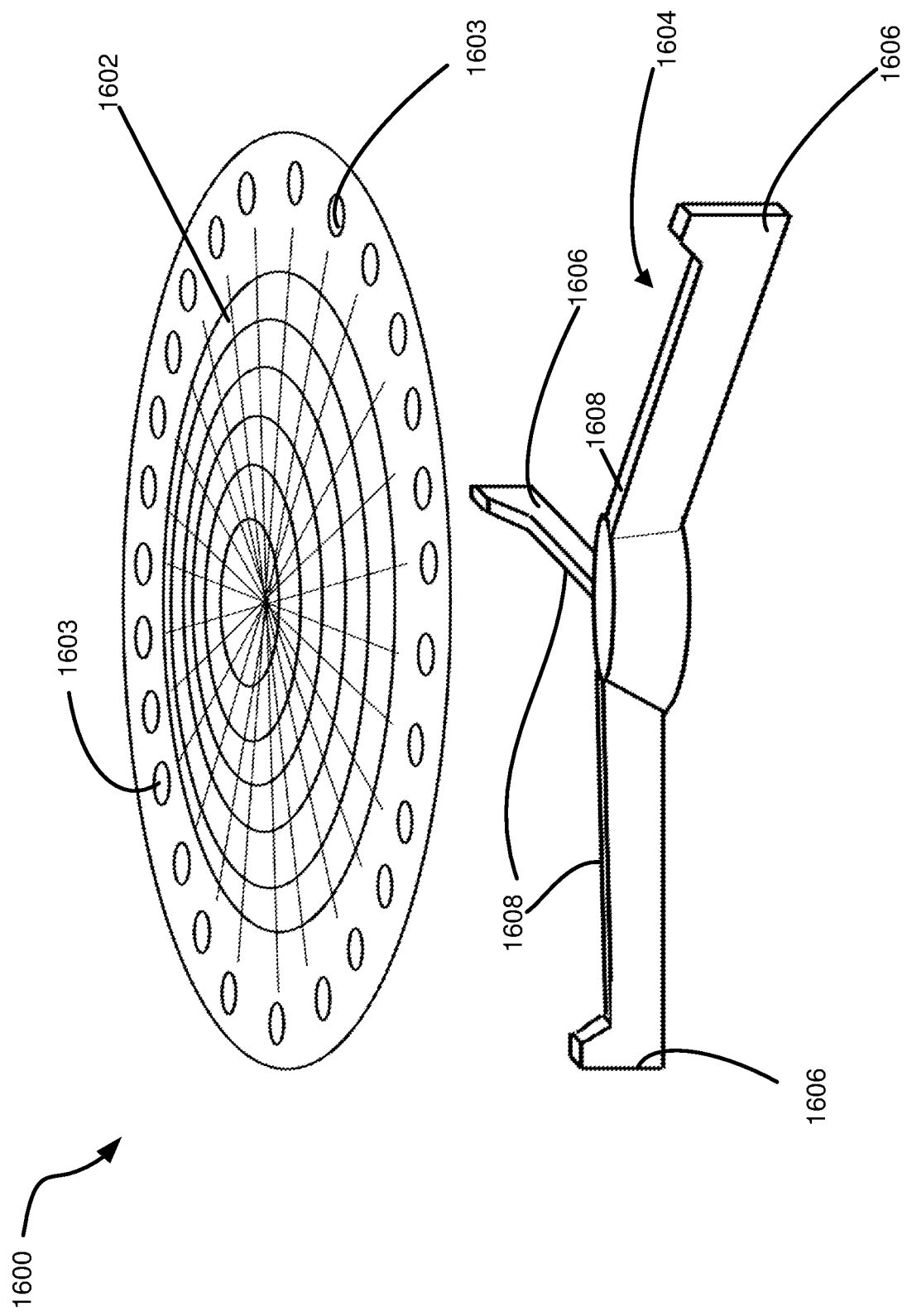
FIG. 16 illustrates a perspective view of a different implementation of rotating blade assembly of an embodiment of a device for producing a shaved ice confection.

FIG. 16 illustrates a perspective view of a blade assembly 1600. The blade assembly includes a blade 1602 including a plurality of holes 1603 and grooves disposed therein configured for conditioning ice into a frozen confection. Fasteners may be disposed through the holes 1603 to attach the blade 1602 to the paddle wheel 1604 via raised ends of a plurality of paddles 1606 of the blade assembly 1600. The paddle wheel 1604 further includes a plurality of paddles 1606 and a channel 1608 formed by a space between an underside of the blade 1602 and a top surface of each of the plurality of paddles 1606 for receiving the blade 1602 when the blade 1602 is attached to the paddle wheel 1604. In FIG. 16, the paddle wheel 1604 may or may not include a base, whereas FIG. 15 illustrates a paddle wheel 1504 with a base.

Figure 17:
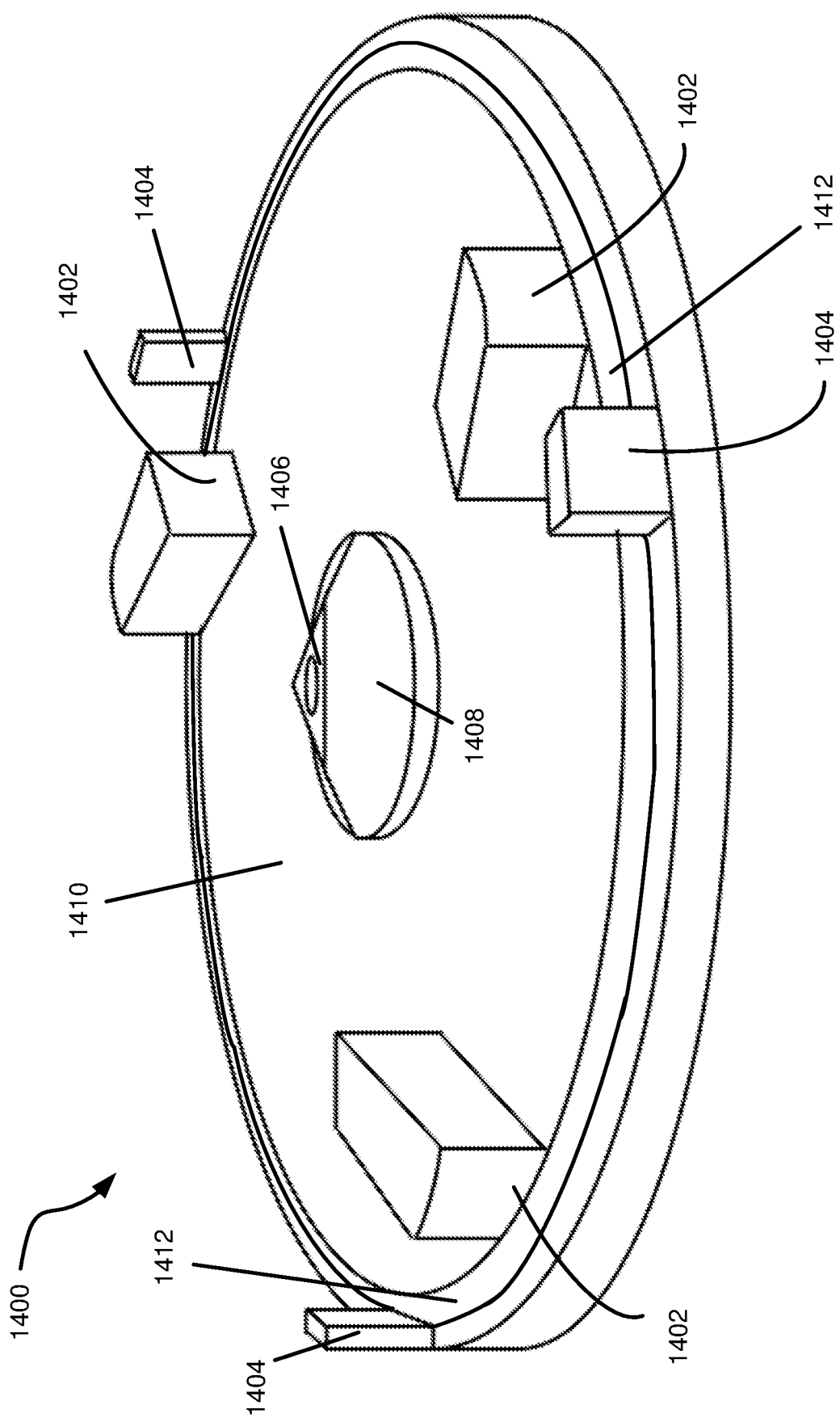
FIG. 17 illustrates a perspective view of a paddle wheel of an embodiment of a device for producing a shaved ice confection.

FIG. 17 illustrates an aerial perspective view of a paddle wheel 1400. The paddle wheel 1400 includes a paddle wheelbase 1410 that may be disposed substantially normal with respect to a drive shaft extending from the motor 1002. The paddle wheel 1400 includes a plurality of paddles 1402 extending substantially normal with respect to the paddle wheelbase 1410 such that the paddles 1402 are substantially normal with respect to the drive shaft extending from the motor 1002. The paddles 1402 are configured for pushing ice cubes and/or chunks of ice against the blade to be conditioned by the blade. The paddle wheel 1400 includes a plurality of ice collectors 1404 extending substantially normal with respect to the paddle wheelbase 1410 such that the ice collectors 1404 are substantially parallel with the paddles 1402. The ice collectors 1404 are configured for pushing conditioned ice around the paddle wheel 1400 until the conditioned ice is dispensed from the device through a spout. The paddle wheel 1400 includes an ice breaking mechanism 1406 for breaking ice cubes and/or chunks of ice into desirable sized pieces of ice to be conditioned by the blade. The ice breaking mechanism 1406 is further configured to prevent ice cubes and/or chunks of ice from melting and attaching to one another to form larger chunks of ice that are difficult to condition with the blade. The plurality of paddles 1402 and plurality of ice collectors 1404 may be spaced such that a groove 1412 may be formed in the paddle wheel 1400 between the plurality of paddles 1402 and the plurality of ice collectors 1404.

Figure 18:
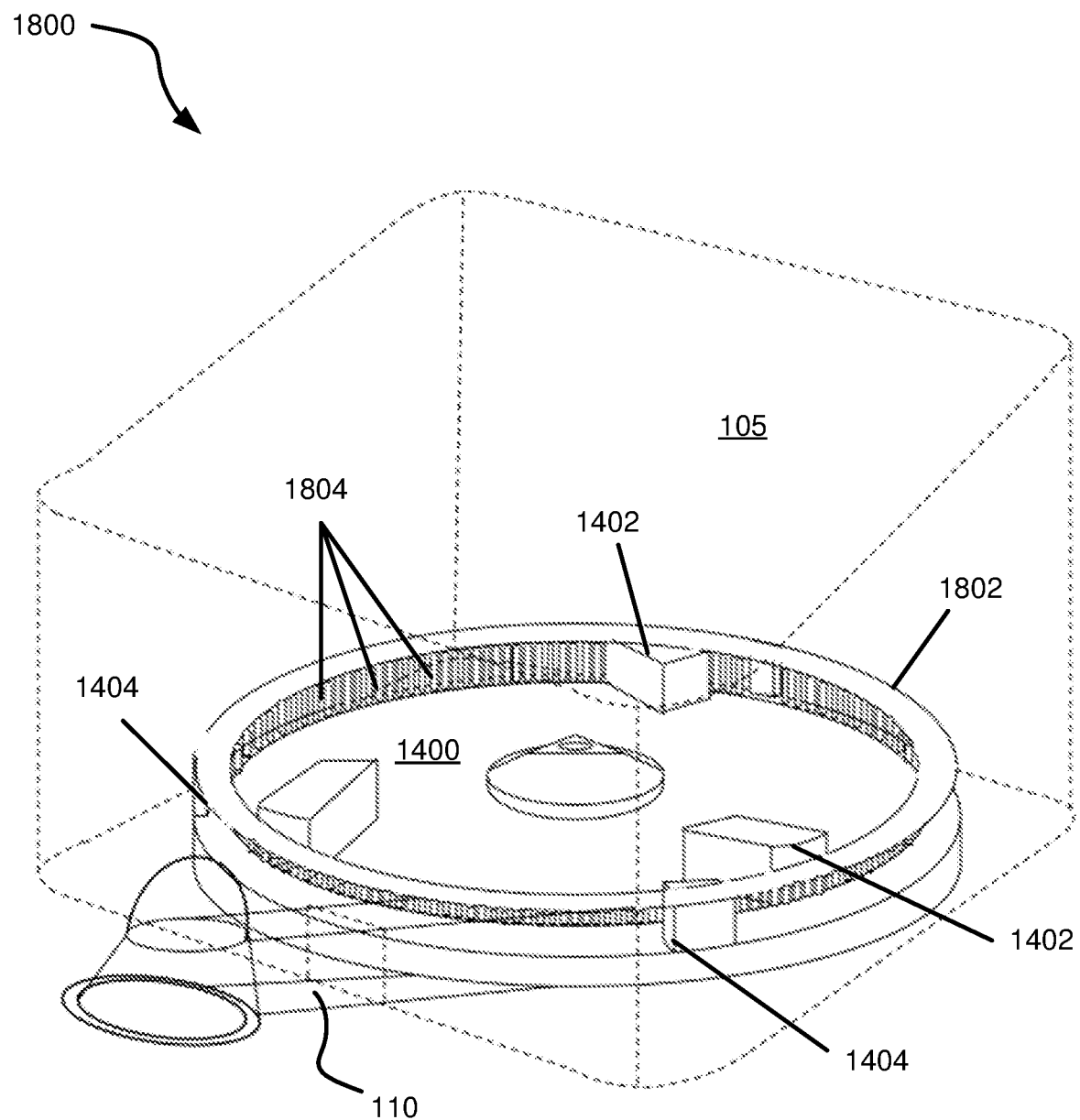
FIG. 18 illustrates a perspective view of an ice conditioning portion of an embodiment of a device for producing a shaved ice confection.

FIG. 18 illustrates a perspective view of a removable portion 1800 of a device for producing a frozen confection comprising a spout 110, an ice shaper, a blade assembly 1802, and a paddle wheel 1400. The blade assembly 1802 may comprise a plurality of notches 1804. The removable portion 1800 of the device includes an ice conditioning housing 105 wherein the blade assembly 1802 is disposed within a groove (see FIG. 14) of the paddle wheel 1400.

In an implementation, an external switch may be provided for actuating the machine. For example, the external switch may be a foot pedal or other switch for actuating the machine. After filling the cup with conditioned ice, a flavoring, drink, or other edible content may be added to the conditioned ice for consumption.

EXAMPLES

The following examples pertain to further embodiments.

Example 1 is a device for conditioning ice. The device includes a base housing comprising at least one upstanding sidewall defining an interior space and an upper surface with respect to the at least one upstanding sidewall. The device includes a motor disposed within the interior space of the base housing. The device includes a sidewall disposed within the upper surface of the base housing defining an opening for receiving a drive shaft therethrough, wherein the drive shaft is mechanically connected to the motor and a blade assembly. The device includes a venting channel disposed in the at least one upstanding sidewall of the base housing for releasing heat emitted by the motor. The device includes a control mechanism for activating and deactivating the motor.

Example 2 is a device as in Example 1, further comprising the ice conditioning portion, wherein the ice conditioning portion is configured to receive a block of ice and comprises: an ice conditioning housing for receiving the block of ice; and the blade assembly, comprising: a paddle wheel mechanically connected to the motor, the paddle wheel comprising a plurality of paddles each comprising a channel for receiving a blade such that the blade spins when the motor is activated; the blade disposed in the channel for each of the plurality of paddles; and a spout assembly.

Example 3 is a device as in any of Examples 1-2, further comprising an arm for depressing the block of ice on to the blade, wherein the blade is substantially normal with respect to the arm.

Example 4 is a device as in any of Examples 1-3, further comprising the ice conditioning portion, wherein the ice conditioning portion is configured to receive a plurality of ice cubes and comprises: an ice conditioning housing for receiving the plurality of ice cubes and feeding the plurality of ice cubes into the blade assembly; and the blade assembly, comprising: a paddle wheel mechanically connected to the motor for spinning the plurality of ice cubes and feeding the plurality of ice cubes through a blade, the paddle wheel comprising a groove for receiving the blade; the blade disposed in the groove of the paddle wheel; and a spout assembly.

Example 5 is a device as in any of Examples 1-4, wherein the paddle wheel is constructed of a single piece of polycarbonate that is sufficiently rigid to feed the plurality of ice cubes through the blade when the motor is activated.

Example 6 is a device as in any of Examples 1-5, wherein the blade is formed in a circular shape and comprises a plurality of notches for cutting the plurality of ice cubes, and wherein the diameter of the blade is larger than the diameter of the paddle wheel.

Example 7 is a device as in any of Examples 1-6, wherein the paddle wheel comprises a plurality of paddles pointing upward relative to the base assembly, wherein the paddles spin within an interior space of the blade when the motor is activated, and wherein the paddles are constructed of polycarbonate and are sufficiently rigid to push the plurality of ice cubes through the notches of the blade.

Example 8 is a device as in any of Examples 1-7, wherein the base housing is injection molded such that the base housing is formed of a single piece of material.

Example 9 is a device as in any of Examples 1-8, further comprising a channel disposed in a bottom wall of the base housing forming a handle for carrying the device.

Example 10 is a device as in any of Examples 1-9, further comprising a plurality of feet attached to a bottom wall of the base housing, the plurality of feet forming a portion of the single piece of material of the base housing.

Example 11 is a device as in any of Examples 1-10, further comprising: a lid for closing the ice conditioning portion, wherein the lid is hinged to the ice conditioning portion; a lid magnet attached to the lid; and an ice receptacle magnet attached to the ice conditioning portion; wherein the lid magnet and the ice receptacle magnet are configured to mate to close the lid on the ice conditioning portion.

Example 12 is a device as in any of Examples 1-11, further comprising a magnet attached to an interior space of the base housing, the magnet configured to mate with a corresponding magnet on the ice conditioning portion to secure the ice conditioning portion of the base housing.

Example 13 is a device as in any of Examples 1-12, further comprising the ice conditioning portion, the ice conditioning portion comprising: an ice conditioning housing configured to mate with the base housing; and a venting channel disposed in a wall of the base housing for releasing heat emitted by the motor.

Example 14 is a device as in any of Examples 1-13, further comprising an attachment mechanism for removably attaching the base housing to an ice conditioning portion for conditioning a block of ice or an ice conditioning portion for conditioning a plurality of ice cubes such that the base housing may mate with multiple different ice conditioning mechanisms for processing different forms of ice.

Example 15 is a device as in any of Examples 1-14, further comprising an ice conditioning portion comprising a failsafe such that the motor is activated only when a lid of the ice conditioning portion is closed.

Example 16 is a device as in any of Examples 1-15, further comprising a blade assembly, the blade assembly comprising: a paddle wheel comprising an opening for receiving the drive shaft of the motor; a plurality of paddles secured to the paddle wheel; a groove disposed within an upper surface of the paddle wheel, the groove configured to receive a circular blade; and a blade bent into a mostly circular orientation and disposed within the groove of the paddle wheel; wherein the motor causes the paddle wheel to spin while the blade remains stationary.

Example 17 is a device as in any of Examples 1-16, wherein the blade assembly further comprises: a plurality of ice collectors attached to the paddle wheel for pushing conditioned ice out through a spout assembly, wherein the plurality of ice collectors are substantially parallel relative to the plurality of paddles; and a spout assembly channel, wherein the conditioned ice exits the paddle wheel through the spout assembly channel to be emitted from the device.

Example 18 is a device as in any of Examples 1-17, further comprising an ice shaper for shaping conditioned ice emitted from the device.

Example 19 is a device as in any of Examples 1-18, further comprising a paddle wheel of a blade assembly, wherein the paddle wheel comprises an ice breaking mechanism for breaking ice into intended cube sizes to be conditioned by the blade assembly.

Example 20 is a device as in any of Examples 1-19, wherein the ice breaking mechanism is attached to a substantially flat surface of the paddle wheel and forms an opening configured for receiving the drive shaft of the motor.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A modular device for conditioning ice, comprising:
   a base housing comprising at least one upstanding sidewall defining an interior space and an upper surface with respect to the at least one upstanding sidewall;
   a first ice conditioning portion;
   a second ice conditioning portion;
   an attachment mechanism located on each of the first ice conditioning portion and the second ice conditioning portion;
   a motor disposed within the interior space of the base housing;
   a drive shaft;
   a blade assembly comprising a blade and a paddle wheel;
   a wall disposed within the upper surface of the base housing defining an opening for receiving the drive shaft therethrough, wherein the drive shaft is mechanically connected to the motor and the blade assembly;
   wherein when the motor is actuated the paddle wheel of the blade assembly rotates within the first ice conditioning portion or within the second ice conditioning portion; and
   wherein the base housing comprises one or more attachment structures that correspond to the attachment mechanism of the first ice conditioning portion and the second ice conditioning portion, such that the base housing is used with either of the first ice conditioning portion or the second ice conditioning portion.

2. The device of claim 1, wherein the first ice conditioning portion is configured to receive a block of ice and comprises:
   an ice conditioning housing for receiving the block of ice;
   the blade assembly, comprising:
      the blade;
      the paddle wheel, wherein the paddle wheel is mechanically connected to the motor;
      wherein the paddle wheel comprises a plurality of paddles;
      wherein the blade is attached to the paddle wheel such that the blade rotates with the paddle wheel when the motor is activated; and
   a spout assembly.

3. The device of claim 2, further comprising an arm for pressing the block of ice on to the blade, wherein the blade is substantially normal with respect to the arm.

4. The device of claim 1, wherein the second ice conditioning portion is configured to receive a plurality of ice cubes and comprises:
   an ice conditioning housing for receiving the plurality of ice cubes and feeding the plurality of ice cubes into the blade assembly;
   the blade assembly, comprising:
      the blade;
      the paddle wheel, wherein the paddle wheel is mechanically connected to the motor for spinning the plurality of ice cubes and feeding the plurality of ice cubes through the blade, the paddle wheel comprising a groove for receiving the blade;

wherein the blade is disposed in the groove of the paddle wheel; and a spout assembly.

5. The device of claim 4, wherein the paddle wheel is constructed of a single piece of polycarbonate that is sufficiently rigid to feed the plurality of ice cubes through the blade when the motor is activated.

6. The device of claim 5, wherein the blade is formed in a circular shape and comprises a plurality of notches for cutting the plurality of ice cubes, and wherein the diameter of the blade is smaller than the diameter of the paddle wheel.

7. The device of claim 5, wherein the paddle wheel comprises a plurality of paddles pointing upward relative to the base housing, wherein the paddles spin within an interior space defined by the blade when the motor is activated, and wherein the paddles are constructed of polycarbonate and are sufficiently rigid to push the plurality of ice cubes through a plurality of notches of the blade.

8. The device of claim 1, wherein the base housing is injection molded such that the base housing is formed of a single piece of material.

9. The device of claim 8, further comprising a channel disposed in a bottom wall of the base housing forming a handle for carrying the device.

10. The device of claim 8, further comprising a plurality of feet attached to a bottom wall of the base housing, the plurality of feet forming a portion of the single piece of material of the base housing.

11. The device of claim 1, further comprising:
a lid, wherein the lid is hinged to the first ice conditioning portion or the second ice conditioning portion;
a lid magnet attached to the lid; and
an ice receptacle magnet attached to the first ice conditioning portion or the second ice conditioning portion;
wherein the lid magnet and the ice receptacle magnet are configured to mate to close the lid on the first ice conditioning portion or the second ice conditioning portion.

12. The device of claim 1, further comprising a magnet attached to an interior space of the base housing, the magnet configured to mate with a corresponding magnet on the first ice conditioning portion or the second ice conditioning portion to secure the first ice conditioning portion or the second ice conditioning portion to the base housing.

13. The device of claim 1, wherein the first ice conditioning portion or the second ice conditioning portion comprises:
an ice conditioning housing configured to mate with the base housing; and
a venting channel disposed in a wall of the base housing for releasing heat emitted by the motor.

14. The device of claim 1, wherein the first ice conditioning portion or the second ice conditioning portion further comprises a control mechanism for activating and deactivating the motor, and a failsafe such that the motor is activated only when a lid of the first ice conditioning portion or the second ice conditioning portion is closed.

15. The device of claim 1, wherein the blade assembly further comprises:
an opening formed in the paddle wheel for receiving the drive shaft of the motor;
a plurality of paddles secured to the paddle wheel;
a groove disposed within an upper surface of the paddle wheel, the groove configured to receive the blade; and
wherein the blade is formed into a substantially circular orientation and is disposed within the groove of the paddle wheel;
wherein the motor causes the paddle wheel to spin while the blade remains stationary.

16. The device of claim 15, wherein the blade assembly further comprises:
a plurality of ice collectors attached to the paddle wheel for pushing conditioned ice out through a spout assembly, wherein the plurality of ice collectors are substantially parallel relative to the plurality of paddles; and
a spout assembly channel, wherein the conditioned ice exits the paddle wheel through the spout assembly channel to be emitted from the device.

17. The device of claim 1, further comprising an ice shaper for shaping conditioned ice emitted from the device.

18. The device of claim 1, wherein the paddle wheel comprises an ice breaker for breaking ice into intended cube sizes to be conditioned by the blade assembly.

19. The device of claim 18, wherein the ice breaking mechanism is attached to a substantially flat surface of the paddle wheel, and wherein an underside of the paddle wheel comprises an opening configured for receiving the drive shaft of the motor.

20. The device of claim 1, further comprising a venting channel disposed in the at least one upstanding sidewall of the base housing for releasing heat emitted by the motor.

21. The device of claim 1, wherein the first ice conditioning portion is replaceable with the second ice conditioning portion, and the second ice conditioning portion is replaceable with the first ice conditioning portion.

* * * * *